United States Patent
He et al.

(10) Patent No.: US 12,140,765 B2
(45) Date of Patent: Nov. 12, 2024

(54) OPTICAL SYSTEM FOR HEAD-MOUNTED DISPLAY

(71) Applicant: Apple Inc., Cupertino, CA (US)

(72) Inventors: Ran He, San Jose, CA (US); Zuoqian Wang, Fremont, CA (US); Brent J. Bollman, Alameda, CA (US); Francois R. Jacob, Sunnyvale, CA (US); Guanjun Tan, Santa Clara, CA (US); John N. Border, Campbell, CA (US); Serhan O. Isikman, Redwood City, CA (US); Wei-Liang Hsu, San Jose, CA (US); Di Liu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/332,435

(22) Filed: Jun. 9, 2023

(65) Prior Publication Data
US 2023/0333390 A1 Oct. 19, 2023

Related U.S. Application Data

(63) Continuation of application No. 17/162,416, filed on Jan. 29, 2021, now Pat. No. 11,719,936.
(Continued)

(51) Int. Cl.
*G02B 27/01* (2006.01)
*G02B 3/04* (2006.01)
(Continued)

(52) U.S. Cl.
CPC ........... *G02B 27/0172* (2013.01); *G02B 3/04* (2013.01); *G02B 5/08* (2013.01); *G02B 5/3083* (2013.01);
(Continued)

(58) Field of Classification Search
CPC ........ G02B 27/0172; G02B 3/04; G02B 5/08; G02B 5/3083; G02B 9/34;
(Continued)

(56) References Cited

U.S. PATENT DOCUMENTS

| 9,323,059 B2 | 4/2016 | Wang et al. |
| 10,203,489 B2 | 2/2019 | Khan et al. |

(Continued)

FOREIGN PATENT DOCUMENTS

| CN | 108713159 A | 10/2018 |
| CN | 110268301 A | 9/2019 |

(Continued)

*Primary Examiner* — William R Alexander
(74) *Attorney, Agent, or Firm* — Treyz Law Group, P.C.; Joseph F. Guihan; Jinie M. Guihan

(57) ABSTRACT

A head-mounted display may include a display system and an optical system that are supported by a housing. The optical system may be a catadioptric optical system having one or more lens elements. In one example, the optical system includes a single lens element and a retarder that is coated on a curved surface of the lens element. The retarder may be coated on an aspheric concave surface of the lens element. In another example the retarder may be coated on an aspheric convex surface of the lens element. One or more components of the optical system may be formed using a direct printing technique. This may allow for one or more adhesive layers and one or more hard coatings to be omitted from the optical system. A lens element may be directly printed on the display system to improve alignment between the optical system and the display system.

20 Claims, 18 Drawing Sheets

Related U.S. Application Data

(60) Provisional application No. 62/993,505, filed on Mar. 23, 2020.

(51) Int. Cl.
  *G02B 5/08* (2006.01)
  *G02B 5/30* (2006.01)
  *G02B 9/34* (2006.01)

(52) U.S. Cl.
  CPC ........ *G02B 9/34* (2013.01); *G02B 2027/0187* (2013.01)

(58) Field of Classification Search
  CPC ...... G02B 2027/0187; G02B 2027/015; G02B 2027/0152; G02B 2027/0138; G02B 25/001; B33Y 80/00
  USPC ........................................................ 359/630
  See application file for complete search history.

(56) References Cited

U.S. PATENT DOCUMENTS

| | | |
|---|---|---|
| 10,451,885 B2 | 10/2019 | Lu et al. |
| 10,663,745 B2 | 5/2020 | Ouderkirk et al. |
| 2014/0368544 A1 | 12/2014 | Kobayashi |
| 2016/0041396 A1 | 2/2016 | Kawamura et al. |
| 2018/0039052 A1 | 2/2018 | Khan et al. |
| 2019/0086675 A1 | 3/2019 | Carollo et al. |
| 2020/0049872 A1* | 2/2020 | Peng .................... G02B 27/283 |
| 2020/0081253 A1 | 3/2020 | Montevirgen et al. |
| 2020/0142254 A1 | 5/2020 | Ryu et al. |
| 2020/0356053 A1 | 11/2020 | Seo et al. |

FOREIGN PATENT DOCUMENTS

| | | |
|---|---|---|
| KR | 100637371 B1 | 10/2006 |
| WO | 2015151004 A1 | 10/2015 |

* cited by examiner

OPTICAL SYSTEM FOR HEAD-MOUNTED DISPLAY

This application is a continuation of non-provisional patent application Ser. No. 17/162,416, filed Jan. 29, 2021, which claims the benefit of provisional patent application No. 62/993,505, filed Mar. 23, 2020, which is hereby incorporated by reference herein in its entirety.

BACKGROUND

This relates generally to optical systems and, more particularly, to optical systems for head-mounted displays.

Head-mounted displays such as virtual reality glasses use lenses to display images for a user. A microdisplay may create images for each of a user's eyes. A lens may be placed between each of the user's eyes and a portion of the microdisplay so that the user may view virtual reality content.

If care is not taken, a head-mounted display may be cumbersome and tiring to wear. Optical systems for head-mounted displays may use arrangements of lenses that are bulky and heavy. Extended use of a head-mounted display with this type of optical system may be uncomfortable.

It would therefore be desirable to be able to provide improved head-mounted displays.

SUMMARY

A head-mounted display may include a display system and an optical system. The display system and optical system may be supported by a housing that is worn on a user's head. The head-mounted display may use the display system and optical system to present images to the user while the housing is being worn on the user's head.

The display system may have a pixel array that produces image light associated with the images. The display system may also have a linear polarizer through which image light from the pixel array passes and a quarter wave plate through which the light passes after passing through the linear polarizer.

The optical system may be a catadioptric optical system having a single lens element. The single lens element may have a retarder that is coated on a curved surface of the lens element. In one example the retarder may be coated on an aspheric concave surface of the lens element. In another example the retarder may be coated on an aspheric convex surface of the lens element. The retarder may be interposed between the lens element and a partially reflective mirror.

In some cases, retarders may be formed on both sides of the lens element. The cumulative retardation provided by the retarders may effectively form a quarter wave plate. In another possible arrangement, a single reflective polarizer and retarder layer may be included in the optical system instead of a reflective polarizer and a separate retarder layer. The reflective polarizer and retarder layer may optionally provide optical power.

In some cases, the optical system may be manufactured using one or more direct 3D printing steps. In the 3D printing process, material for a component in the optical system (e.g., material for a lens element) may be printed directly on the underlying layers in the stack. This type of direct printing process may be used for one or more components in the optical system. This type of manufacturing technique may allow for one or more adhesive layers and/or one or more hard coatings to be omitted from the optical system.

DETAILED DESCRIPTION

Head-mounted displays may be used for virtual reality and augmented reality systems. For example, a pair of virtual reality glasses that is worn on the head of a user may be used to provide a user with virtual reality content and/or augmented reality content.

Figure 1:
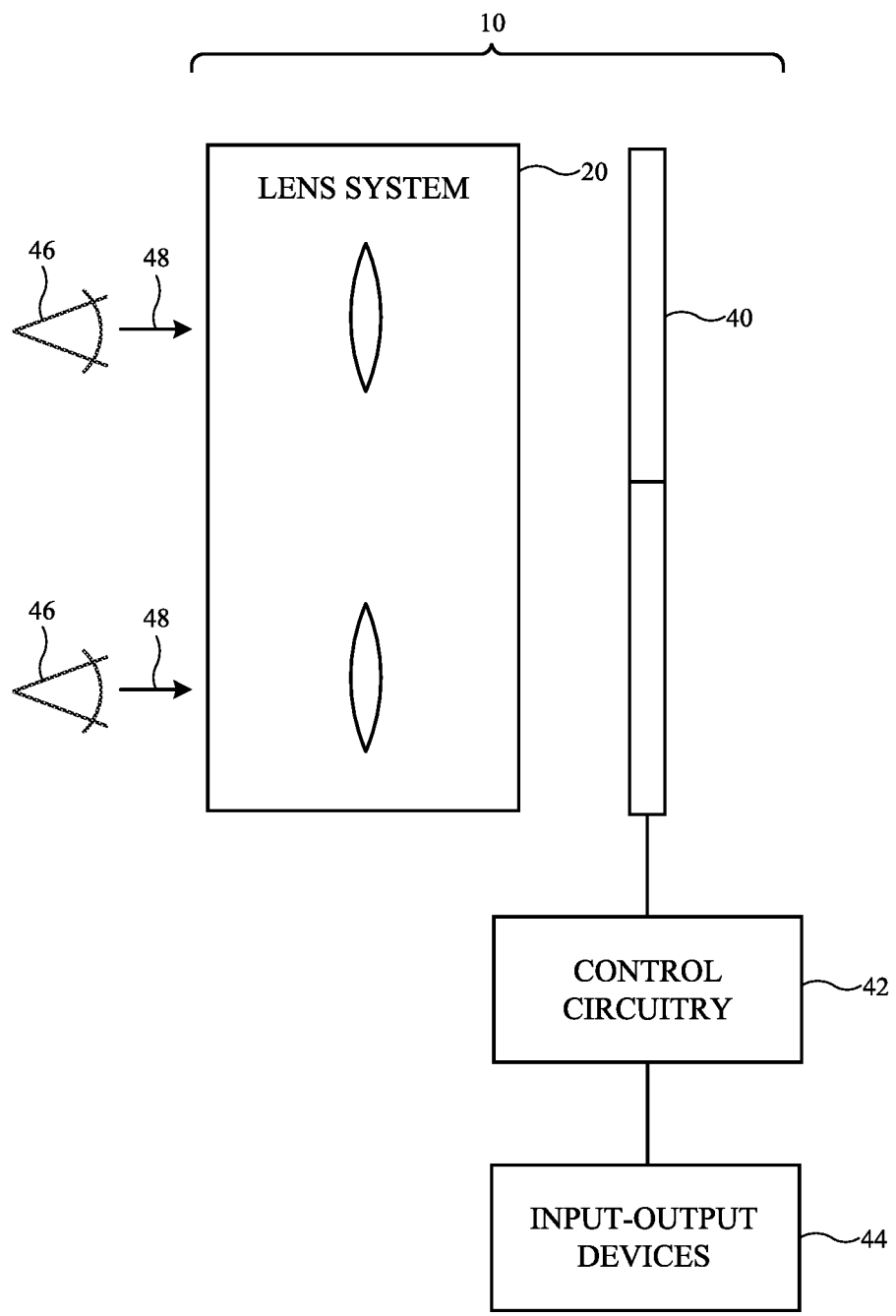
FIG. 1 is a diagram of an illustrative head-mounted display in accordance with an embodiment.

An illustrative system in which an electronic device (e.g., a head-mounted display such as a pair of virtual reality glasses) is used in providing a user with virtual reality content is shown in FIG. 1. As shown in FIG. 1, virtual reality glasses 10 (sometimes referred to as glasses 10, electronic device 10, head-mounted display 10, etc.) may include a display system such as display system 40 that creates images and may have an optical system such as optical system 20 through which a user (see, e.g., user's eyes 46) may view the images produced by display system 40 by looking in direction 48.

Display system 40 (sometimes referred to as display panel 40 or display 40) may be based on a liquid crystal display, an organic light-emitting diode display, an emissive display having an array of crystalline semiconductor light-emitting diode dies, and/or displays based on other display technologies. Separate left and right displays may be included in system 40 for the user's left and right eyes or a single display may span both eyes.

Visual content (e.g., image data for still and/or moving images) may be provided to display system (display) 40 using control circuitry 42 that is mounted in glasses (head-mounted display) 10 and/or control circuitry that is mounted outside of glasses 10 (e.g., in an associated portable electronic device, laptop computer, or other computing equipment). Control circuitry 42 may include storage such as hard-disk storage, volatile and non-volatile memory, electrically programmable storage for forming a solid-state drive, and other memory. Control circuitry 42 may also include one or more microprocessors, microcontrollers, digital signal processors, graphics processors, baseband processors, application-specific integrated circuits, and other processing circuitry. Communications circuits in circuitry 42 may be used to transmit and receive data (e.g., wirelessly and/or over wired paths). Control circuitry 42 may use display system 40 to display visual content such as virtual reality content (e.g., computer-generated content associated with a virtual world), pre-recorded video for a movie or other media, or other images. Illustrative configurations in which control circuitry 42 provides a user with virtual reality content using display system 40 may sometimes be described herein as an example. In general, however, any suitable content may be presented to a user by control circuitry 42 using display system 40 and optical system 20 of glasses 10.

Input-output devices 44 may be coupled to control circuitry 42. Input-output devices 44 may be used to gather user input from a user, may be used to make measurements on the environment surrounding glasses 10, may be used to provide output to a user, and/or may be used to supply output to external electronic equipment. Input-output devices 44 may include buttons, joysticks, keypads, keyboard keys, touch sensors, track pads, displays, touch screen displays, microphones, speakers, light-emitting diodes for providing a user with visual output, sensors (e.g., a force sensors, temperature sensors, magnetic sensor, accelerometers, gyroscopes, and/or other sensors for measuring orientation, position, and/or movement of glasses 10, proximity sensors, capacitive touch sensors, strain gauges, gas sensors, pressure sensors, ambient light sensors, and/or other sensors). If desired, input-output devices 44 may include one or more cameras (e.g., cameras for capturing images of the user's surroundings, cameras for performing gaze detection operations by viewing eyes 46, and/or other cameras).

Figure 2:
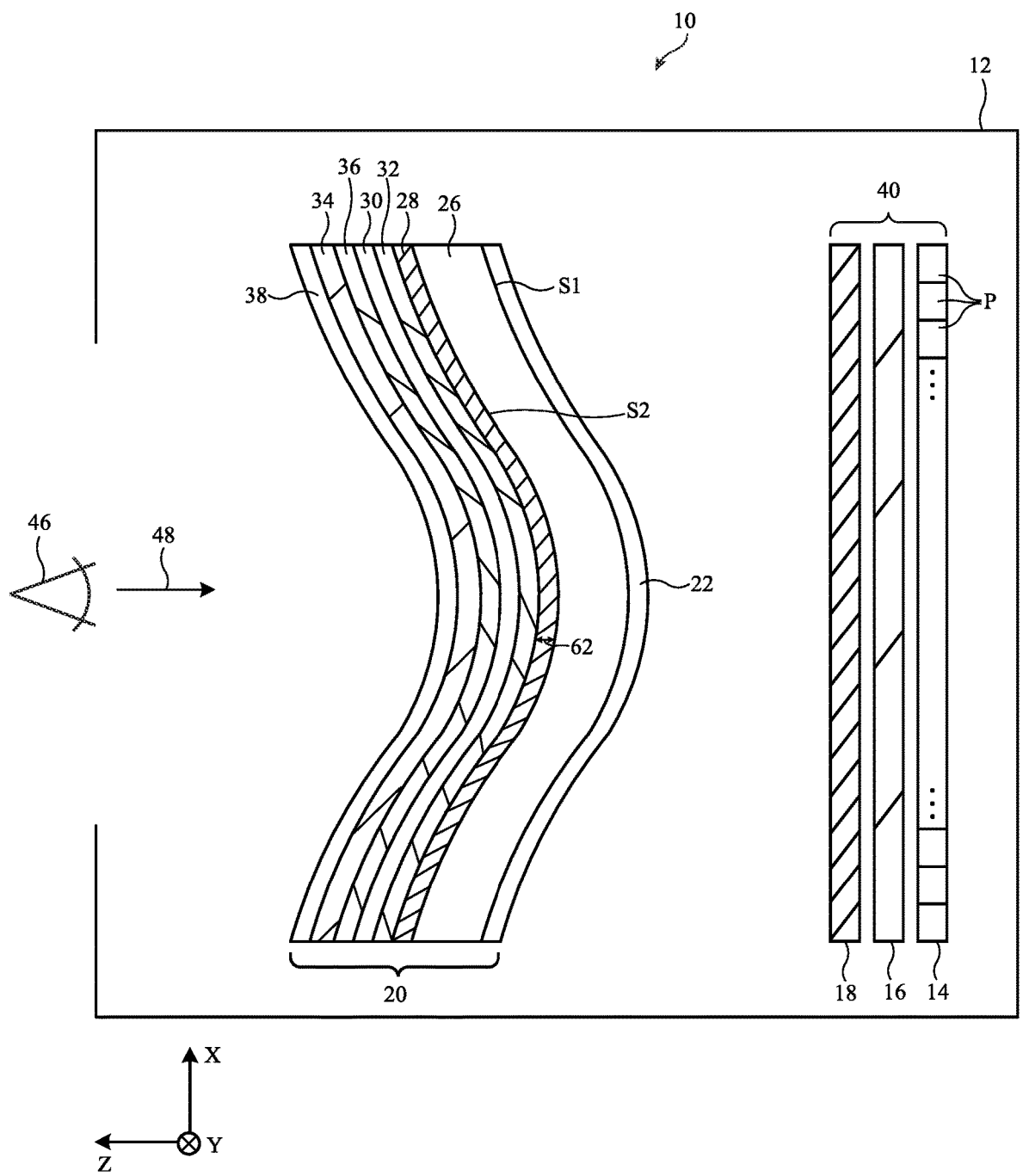
FIG. 2 is a diagram of an illustrative head-mounted display showing components of an illustrative optical system in the head-mounted display in accordance with an embodiment.

FIG. 2 is a cross-sectional side view of glasses 10 showing how optical system 20 and display system 40 may be supported by head-mounted support structures such as housing 12 for glasses 10. Housing 12 may have the shape of a frame for a pair of glasses (e.g., glasses 10 may resemble eyeglasses), may have the shape of a helmet (e.g., glasses 10 may form a helmet-mounted display), may have the shape of a pair of goggles, or may have any other suitable housing shape that allows housing 12 to be worn on the head of a user. Configurations in which housing 12 supports optical system 20 and display system 40 in front of a user's eyes (e.g., eyes 46) as the user is viewing system 20 and display system 40 in direction 48 may sometimes be described herein as an example. If desired, housing 12 may have other desired configurations.

Housing 12 may be formed from plastic, metal, fiber-composite materials such as carbon-fiber materials, wood and other natural materials, glass, other materials, and/or combinations of two or more of these materials.

Input-output devices 44 and control circuitry 42 may be mounted in housing 12 with optical system 20 and display system 40 and/or portions of input-output devices 44 and control circuitry 42 may be coupled to glasses 10 using a cable, wireless connection, or other signal paths.

Display system 40 and the optical components of glasses 10 may be configured to display images for user 46 using a lightweight and compact arrangement. Optical system 20 may, for example, be based on catadioptric lenses (e.g., lenses that use both reflecting and refracting of light).

Display system 40 may include a source of images such as pixel array 14. Pixel array 14 may include a two-dimensional array of pixels P that emits image light (e.g., organic light-emitting diode pixels, light-emitting diode pixels formed from semiconductor dies, liquid crystal display pixels with a backlight, liquid-crystal-on-silicon pixels with a frontlight, etc.). A polarizer such as linear polarizer 16 may be placed in front of pixel array 14 and/or may be laminated to pixel array 14 to provide polarized image light. Linear polarizer 16 may have a pass axis aligned with the X-axis of FIG. 2 (as an example). Display system 40 may also include a wave plate such as quarter wave plate 18 to provide circularly polarized image light. The fast axis of quarter wave plate 18 may be aligned at 45 degrees relative to the pass axis of linear polarizer 16. Quarter wave plate 18 may be mounted in front of polarizer 16 (between polarizer 16 and optical system 20). If desired, quarter wave plate 18 may be attached to polarizer 16 (and display 14).

Optical system 20 may include a lens element such as lens element 26. Lens element 26 may be formed from a transparent material such as plastic or glass. Lens element 26 may have a surface S1 that faces display system 40 and a surface S2 that faces the user (e.g. eyes 46). Surface S1 may be a convex surface (e.g., a spherically convex surface, a cylindrically convex surface, or an aspherically convex surface) or a concave surface (e.g., a spherically concave surface, a cylindrically concave surface, or an aspherically concave surface). Surface S2 may be a convex surface (e.g., a spherically convex surface, a cylindrically convex surface, or an aspherically convex surface) or a concave surface (e.g., a spherically concave surface, a cylindrically concave surface, or an aspherically concave surface). A spherically curved surface (e.g., a spherically convex or spherically concave surface) may have a constant radius of curvature across the surface. In contrast, an aspherically curved surface (e.g., an aspheric concave surface or an aspheric convex surface) may have a varying radius of curvature across the surface. A cylindrical surface may only be curved about one axis instead of about multiple axes as with the spherical surface. In one illustrative arrangement, shown in FIG. 2, surface S1 is an aspheric convex surface and surface S2 is an aspheric concave surface. This arrangement may be described as an example herein.

Optical structures such as partially reflective coatings, wave plates, reflective polarizers, linear polarizers, antireflection coatings, and/or other optical components may be incorporated into glasses 10 (e.g., system 20, etc.). These optical structures may allow light rays from display system 40 to pass through and/or reflect from surfaces in optical system 20 such as surfaces S1 and S2, thereby providing optical system 20 with a desired lens power.

An illustrative arrangement for the optical layers is shown in FIG. 2. First, the structural arrangement of these layers will be described. The functionality of these layers will be discussed in more detail in connection with FIG. 3.

As shown in FIG. 2, a partially reflective mirror (e.g., a metal mirror coating or other mirror coating such as a dielectric multilayer coating with a 50% transmission and a 50% reflection) such as partially reflective mirror 22 may be formed on the aspheric convex surface S1 of lens element 26. Partially reflective mirror 22 may sometimes be referred to as beam splitter 22, half mirror 22, or partially reflective layer 22.

A wave plate such as wave plate 28 may be formed on the aspheric concave surface S2 of lens element 26. Wave plate 28 (sometimes referred to as retarder 28, quarter wave plate 28, etc.) may be a quarter wave plate that conforms to surface S2 of lens element 26. Retarder 28 may be a coating on surface S2 of lens element 26.

Reflective polarizer 30 may be attached to retarder 28 using adhesive layer 32. Reflective polarizer 30 may have orthogonal reflection and pass axes. Light that is polarized parallel to the reflection axis of reflective polarizer 30 will be reflected by reflective polarizer 30. Light that is polarized perpendicular to the reflection axis and therefore parallel to the pass axis of reflective polarizer 30 will pass through reflective polarizer 30. Adhesive layer 32 may be a layer of optically clear adhesive (OCA).

Linear polarizer 34 may be attached to reflective polarizer 30 using adhesive layer 36. Polarizer 34 may be referred to as an external blocking linear polarizer 34. Linear polarizer 34 may have a pass axis aligned with the pass axis of reflective polarizer 30. Linear polarizer 34 may have a pass axis that is orthogonal to the pass axis of linear polarizer 16. Adhesive layer 36 may be a layer of optically clear adhesive (OCA).

One or more additional coatings 38 may also be included in optical system 20 (sometimes referred to as lens 20, lens assembly 20, or lens module 20). Coatings 38 may include an anti-reflective coating (ARC), anti-smudge (AS) coating, or any other desired coatings.

Figure 3:
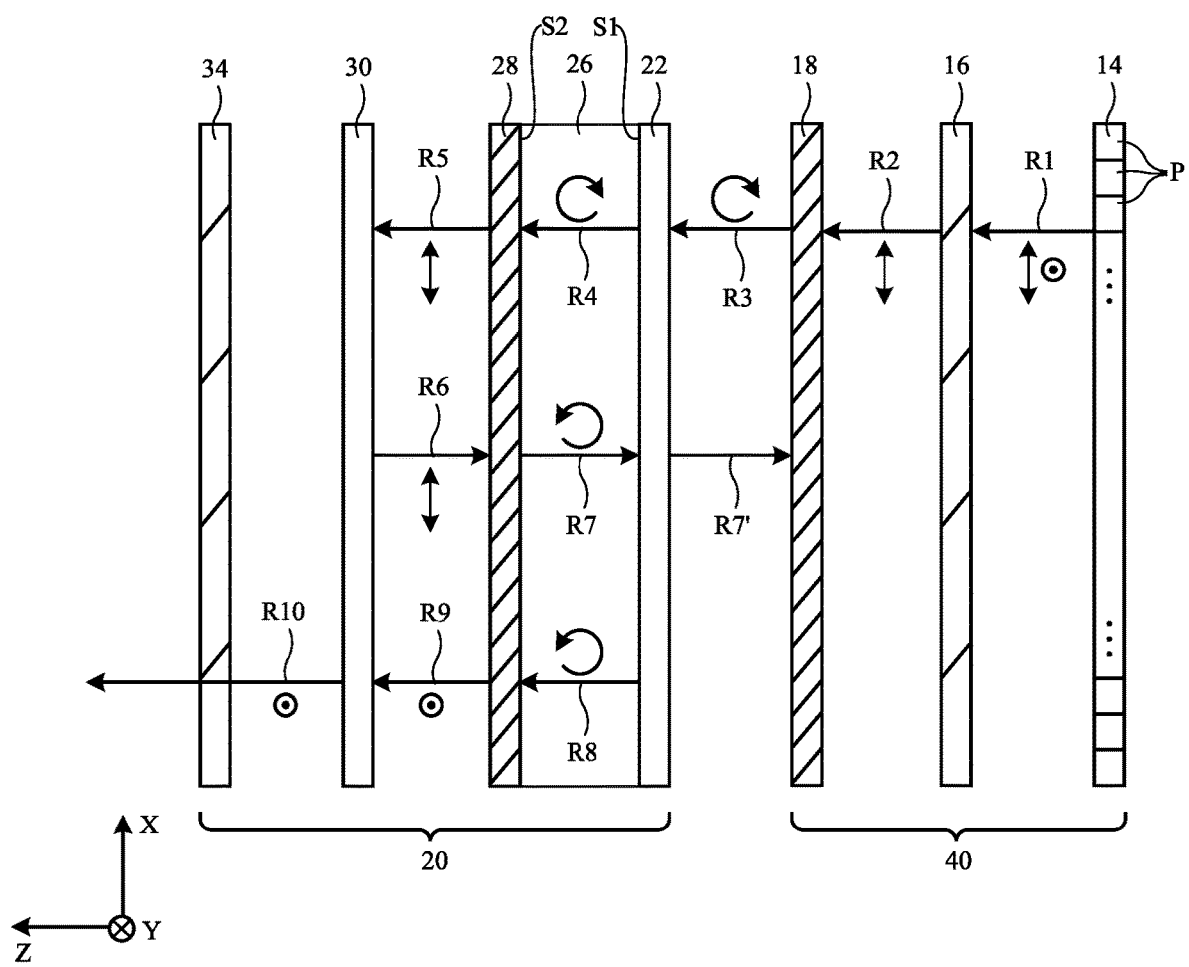
FIG. 3 is a cross-sectional side view of an illustrative head-mounted display showing how the polarization of light changes when passing through the optical system of FIG. 2 in accordance with an embodiment.

FIG. 3 is a cross-sectional side view of an illustrative optical system 20 and display system 40 showing how light from the display passes through the optical system of FIG. 2. Note that the adhesive layers 32 and 36 as well as coatings 38 are not shown in FIG. 3 since these layers do not appreciably impact the polarization of light travelling through the system. As shown in FIG. 3, a light ray R1 may be emitted from display 14. Light ray R1 exits display 14 having a mix of polarization states. As image light ray R1 exits display 14 and passes through linear polarizer 16, ray R1 becomes linearly polarized in alignment with the pass axis of linear polarizer 16. The pass axis of linear polarizer 16 may be, for example, aligned with the X-axis of FIG. 3. After passing through polarizer 16, ray R2 passes through wave plate 18, which may be a quarter wave plate. As ray R2 passes through quarter wave plate 18, ray R3 exits the quarter wave plate circularly polarized (e.g., with a clockwise circular polarization).

When circularly polarized ray R3 strikes partially reflective mirror 22, a portion of ray R3 will pass through partially reflective mirror 22 to become reduced-intensity ray R4. Ray R4 will be refracted (partially focused) by the shape of aspheric convex surface S1 of lens element 26. It should be noted that the depiction of surfaces of S1 and S2 as planar in FIG. 3 is merely illustrative. In practice, surfaces S1 and S2 may be curved (e.g., aspheric convex and aspheric concave) as discussed in connection with FIG. 2.

Wave plate 28 may convert the circular polarization of ray R4 into linear polarization. Quarter wave plate 28 may, for example, convert circularly polarized ray R4 into a ray R5 with a linear polarization aligned with the X-axis of FIG. 2. Quarter wave plate 28 in optical system 20 may be rotated 90 degrees relative to quarter wave plate 18 in display 40 (e.g., the fast axes of quarter wave plates 18 and 28 are orthogonal).

As previously mentioned, reflective polarizer 30 may have orthogonal reflection and pass axes. Light that is polarized parallel to the reflection axis of reflective polarizer 30 will be reflected by reflective polarizer 30. Light that is polarized perpendicular to the reflection axis and therefore parallel to the pass axis of reflective polarizer 30 will pass through reflective polarizer 30. In the illustrative arrangement of FIG. 3, reflective polarizer 30 has a reflection axis that is aligned with the X-axis and a pass axis that is aligned with the Y-axis, so ray R5 will reflect from reflective polarizer 30 as reflected ray R6. It should be noted that the pass axis of reflective polarizer 30 is orthogonal to the pass axis of linear polarizer 16 in display system 40.

Reflected ray R6 has a linear polarization aligned with the X-axis. After passing through quarter wave plate 28, the linear polarization of ray R6 will be converted into circular polarization (i.e., ray R6 will become counter-clockwise circularly polarized ray R7).

Circularly polarized ray R7 will travel through lens element 26 and a portion of ray R7 will be reflected in the positive Z direction by the partially reflective mirror 22 on the convex surface S1 of lens element 26 as reflected ray R8. The reflection from the curved shape of surface S1 provides optical system 20 with additional optical power. It should be noted that any portion of ray R7 that is transmitted by the partially reflective layer 22 (e.g., R7' in the negative Z-direction) may be converted to a linear polarization by quarter wave plate 18 and then reaches linear polarizer 16. This linearly polarized light has a polarization aligned with the Y-axis (e.g., orthogonal to the pass axis of linear polarizer 16) so that it is absorbed by linear polarizer 16. As a result, contrast degradation and stray light artifacts from this portion of R7 are prevented in the image viewed by the user.

Ray R8 from partially reflective mirror 22 is converted from circularly polarized light to linearly polarized light ray R9 by quarter wave plate 28. Passing through the curved surface S2 of lens element 26 also provides optical system 20 with additional optical power (e.g., refractive optical power). The linear polarization of ray R9 is aligned with the Y-axis, which is parallel to the pass axis of reflective polarizer 30. Accordingly, ray R9 will pass through reflective polarizer 30 as ray R10 to provide a viewable image to the user.

Linear polarizer 34 has a pass axis aligned with the pass axis of reflective polarizer 30 (i.e., parallel to the Y-axis in this example) so that any light from the external environment will be polarized by linear polarizer 34 such that light is not reflected by the reflective polarizer 30. Any light that is transmitted by the linear polarizer 34 and the reflective polarizer 30 will pass through retarders 28 and 18 and be absorbed by linear polarizer 16. Linear polarizer 34 has a pass axis (parallel to the Y-axis) that is orthogonal to the pass axis (parallel to the X-axis) of linear polarizer 16 in the display.

The optical system 20 may be formed as a single, solid lens assembly without any intervening air gaps. Additionally, the lens assembly (without any intervening air gaps) includes only one lens element (26). As shown in FIG. 2, each layer in optical system 20 is attached directly to the adjacent layers. This is particularly noteworthy for the case of retarder 28 being attached directly to the aspheric concave surface S2 of lens element 26.

Conventionally, retarders are planar. However, in some embodiments, retarder 28 is a coating that is applied directly on the curved surface of lens element 26 to provide uniform retardation across the lens element. Thereby, retarder 28 in FIG. 2 may have aspheric curvature (e.g., curvature along multiple axes and with different radii of curvature) with a relatively uniform thickness to provide a relatively uniform retardation. Retardation is equal to the thickness of the retarder multiplied by the birefringence of the retarder material. The thickness 62 (shown in FIG. 2) of retarder 28 may be relatively uniform across the optical system (lens assembly). Retarder 28 conforms to the three-dimensional surface of lens element 26 and may sometimes be referred to as a coating (e.g., coating 28 or retarder coating 28).

As specific examples, the retardation provided by retarder 28 across the entire retarder may be uniform within 20%, within 10%, within 5%, within 3%, within 2%, within 1%, etc. Similarly, the thickness 62 of retarder 28 across the entire retarder may be uniform within 20%, within 10%, within 5%, within 3%, within 2%, within 1%, etc. In other words, the retardation variation across the retarder is no more than 20%, no more than 10%, no more than 5%, no more than 3%, no more than 2%, no more than 1%, etc. The thickness variation across the retarder is no more than 20%, no more than 10%, no more than 5%, no more than 3%, no more than 2%, no more than 1%, etc.

An alternate design to the highly uniform retarder 28 on the aspheric surface S2 of lens element 26 is having a planar surface S2 and an additional lens element in the lens assembly. In this case, the multi-lens-element design is required for the desired optical power. However, the single lens element design of FIGS. 2 and 3 is a more compact (thinner), lighter solution than a multiple lens element design. Having a compact, light lens design is valuable to improve the user experience, particularly in head-mounted devices. The single lens element design of FIGS. 2 and 3 may also have more curvature than a multiple lens element design. Having a single lens element also obviates any issues of alignment between the multiple lens elements and may result in omission of other layers from the optical system (e.g., other adhesive layers, retarders, etc.). As yet another benefit, the single lens element module of FIGS. 2 and 3 has a lower materials/manufacturing cost due to the reduced number of layers and simplified manufacturing process.

Retarder 28 may be formed from any desired materials using any desired processes. As one example, retarder 28 may be formed from a liquid crystal material that is deposited over a photo-aligned alignment layer. As another example, retarder 28 may be formed from a liquid crystal material that is aligned using shear alignment. As yet another example, retarder 28 may be formed from an inorganic material using oblique deposition. The materials for retarder 28 may be deposited using spin coating, spray coating, physical vapor deposition (PVD), or any other desired techniques.

The example of a material having a uniform birefringence and relatively uniform birefringence being used to form the retarder is merely illustrative. Any type of retarder that provides uniform retardation may be used. As one example, the retarder may have a first thickness and a first birefringence in a first portion. The retarder may have a second thickness and a second birefringence in a second portion. The second birefringence may be different than the first birefringence and the second thickness may be different than the first thickness. However, the retardation may be the same in both portions. In other words, the retarder may be provided with different birefringence in different portions that are compensated by different thicknesses in the different portions to provide uniform retardation. These types of techniques may be used to provide uniform retardation even when uniform thickness is not practical from a manufacturing standpoint.

Figure 4:
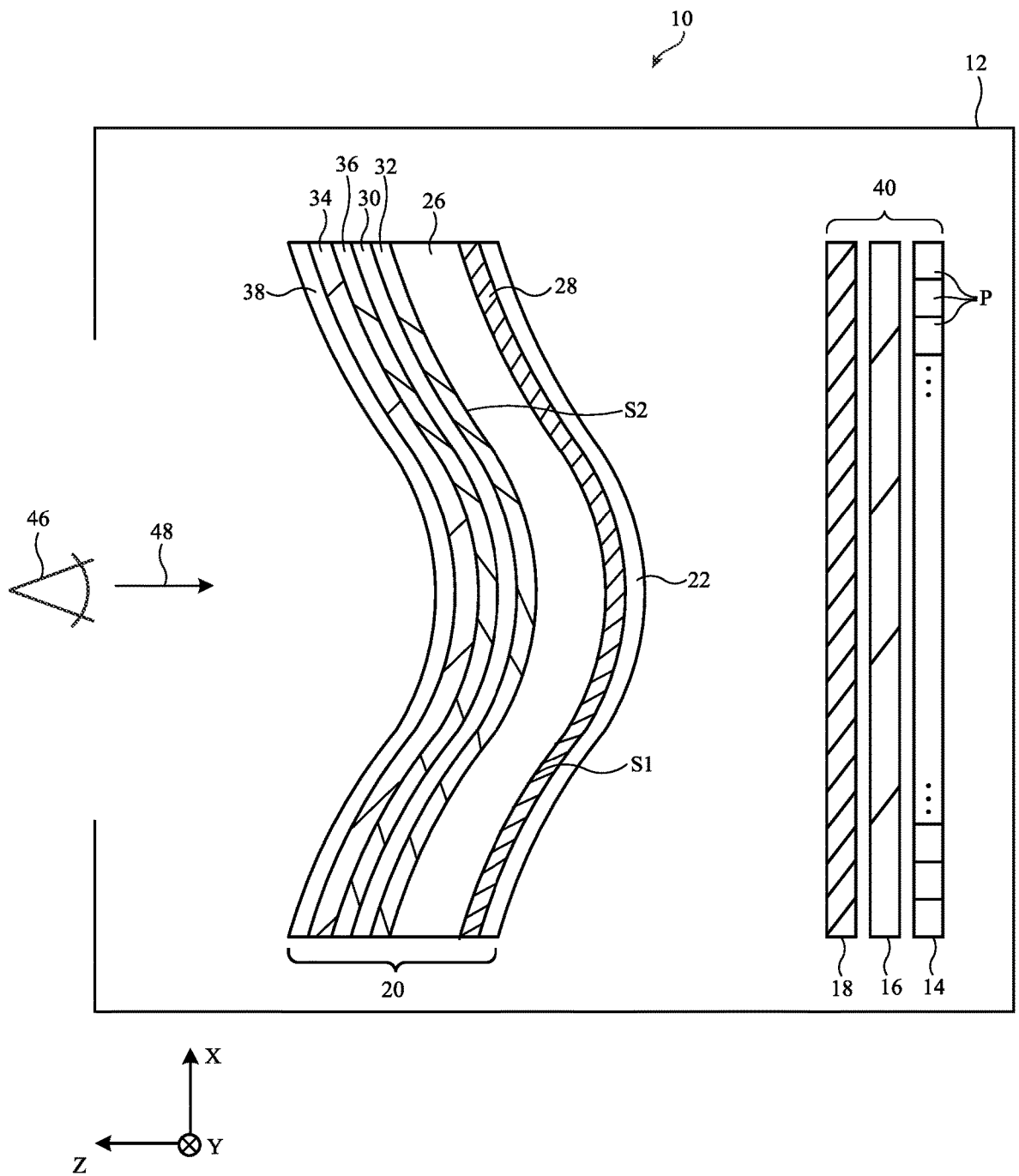
FIG. 4 is a diagram of an illustrative head-mounted display showing components of an illustrative optical system in the head-mounted display with a retarder on an aspheric convex surface in accordance with an embodiment.

FIG. 4 is a cross-sectional side view of an alternate design for optical system 20. Optical system 20 in FIG. 4 is similar to the optical system shown in connection with FIG. 2. Optical system 20 in FIG. 4 includes a lens element 26 having an aspheric convex surface S1 and an aspheric concave surface S2. On the side of lens element 26 facing eye 46 (e.g., on surface S2), there is an adhesive layer 32, reflective polarizer 30, adhesive layer 36, linear polarizer 34, and coatings 38. On the side of lens element 26 facing display 14 (e.g., on surface S1), there is a partially reflective layer 22. These layers are all in the same relative positions as in FIG. 2.

However, in FIG. 2, retarder 28 is positioned adjacent to S2 of lens element 26. In particular, retarder 28 is interposed between adhesive layer 32 and lens element 26. In contrast, in FIG. 4, retarder 28 is positioned adjacent to surface S1 of lens element 26. Retarder 28 in FIG. 4 is interposed between partially reflective layer 22 and lens element 26.

The functionality of the optical layers in optical system 20 is the same in FIG. 4 as in FIG. 2. However, in FIG. 4 the retarder 28 is on the convex side of the lens element (instead of on the concave side of the lens element). Retarder 28 in FIG. 4 may be formed from the same materials and may have the same retardation and thickness uniformities as discussed in connection with FIG. 2. From a manufacturing standpoint, forming a uniform thickness retarder may be easier on the convex side of the lens element than on the concave side of the lens element. Therefore, positioning retarder 28 on the convex surface S1 of lens element 26 may improve the ease and cost of manufacturing.

Figure 5:
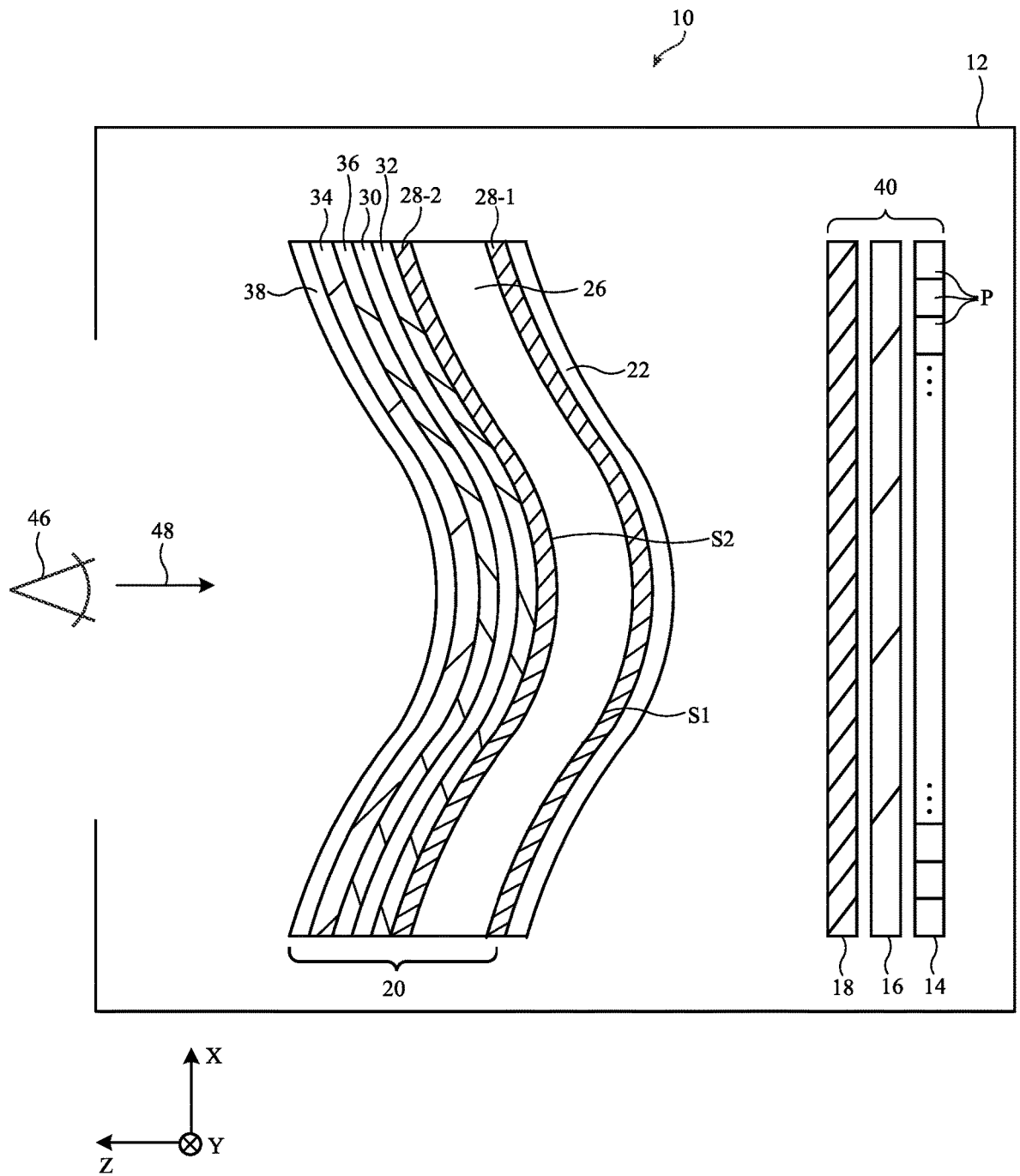
FIG. 5 is a diagram of an illustrative head-mounted display showing components of an illustrative optical system in the head-mounted display with a first retarder on an aspheric convex surface and a second retarder on an aspheric concave surface in accordance with an embodiment.

FIG. 5 is a cross-sectional side view of an alternate design for optical system 20. Optical system 20 in FIG. 5 is similar to the optical system shown in connection with FIG. 2. Optical system 20 in FIG. 5 includes a lens element 26 having an aspheric convex surface S1 and an aspheric concave surface S2. On the side of lens element 26 facing eye 46, there is an adhesive layer 32, reflective polarizer 30, adhesive layer 36, linear polarizer 34, and coatings 38. On the side of lens element 26 facing display 14, there is a partially reflective layer 22. These layers are all in the same relative positions as in FIG. 2.

However, in FIG. 2, optical system 20 includes only one retarder 28 that is positioned adjacent to surface S2 of lens element 26. In contrast, in FIG. 5, optical system 20 includes first and second retarders 28-1 and 28-2, with each retarder positioned on opposing sides of the lens element. In particular, retarder 28-2 is positioned adjacent to surface S2 of lens element 26. Retarder 28-2 is interposed between adhesive layer 32 and lens element 26. Retarder 28-1 is positioned adjacent to surface S1 of lens element 26. Retarder 28-1 is interposed between partially reflective layer 22 and lens element 26.

The functionality of the optical layers in optical system 20 is the same in FIG. 5 as in FIG. 2. However, in FIG. 5 the retarder 28 is split between both sides of the lens element (instead of on one side of the lens element). In particular retarder 28-2 may be a compensating retarder that compensates for retardation variations in retarder 28-1. Referring to one retarder as a compensating retarder is merely a matter of nomenclature. In general, each retarder may compensate for the variations in the other retarder. The two retarders collectively provide a uniform retardation across the optical system.

The two retarders of FIG. 5 may be able to account for manufacturing variations in depositing each retarder individually. For example, when forming retarder 28-1 on the convex side of the lens element, the edges of the retarder may tend to be thicker than the center of the retarder. On the other hand, when forming retarder 28-2 on the concave side of the lens element, the center of the retarder may tend to be thicker than the edges of the retarder. Therefore, the thick center of retarder 28-2 will overlap the thin center of retarder 28-1 and the thick edges of retarder 28-1 will overlap the thin center of retarder 28-1. The cumulative thickness of retarders 28-1 and 28-2 may therefore be uniform across the optical system.

As specific examples, the cumulative retardation provided by retarders 28-1 and 28-2 across the entire optical system may be uniform within 20%, within 10%, within 5%, within 3%, within 2%, within 1%, etc. Similarly, the cumulative thickness of retarders 28-1 and 28-2 across the entire retarder may be uniform within 20%, within 10%, within 5%, within 3%, within 2%, within 1%, etc. In other words, the retardation variation across the retarders is no more than 20%, no more than 10%, no more than 5%, no more than 3%, no more than 2%, no more than 1%, etc. The thickness variation across the retarders is no more than 20%, no more than 10%, no more than 5%, no more than 3%, no more than 2%, no more than 1%, etc. Both retarders 28-1 and 28-2 in FIG. 5 may be formed from the same materials and processes as discussed in connection with FIG. 2.

Figure 6:
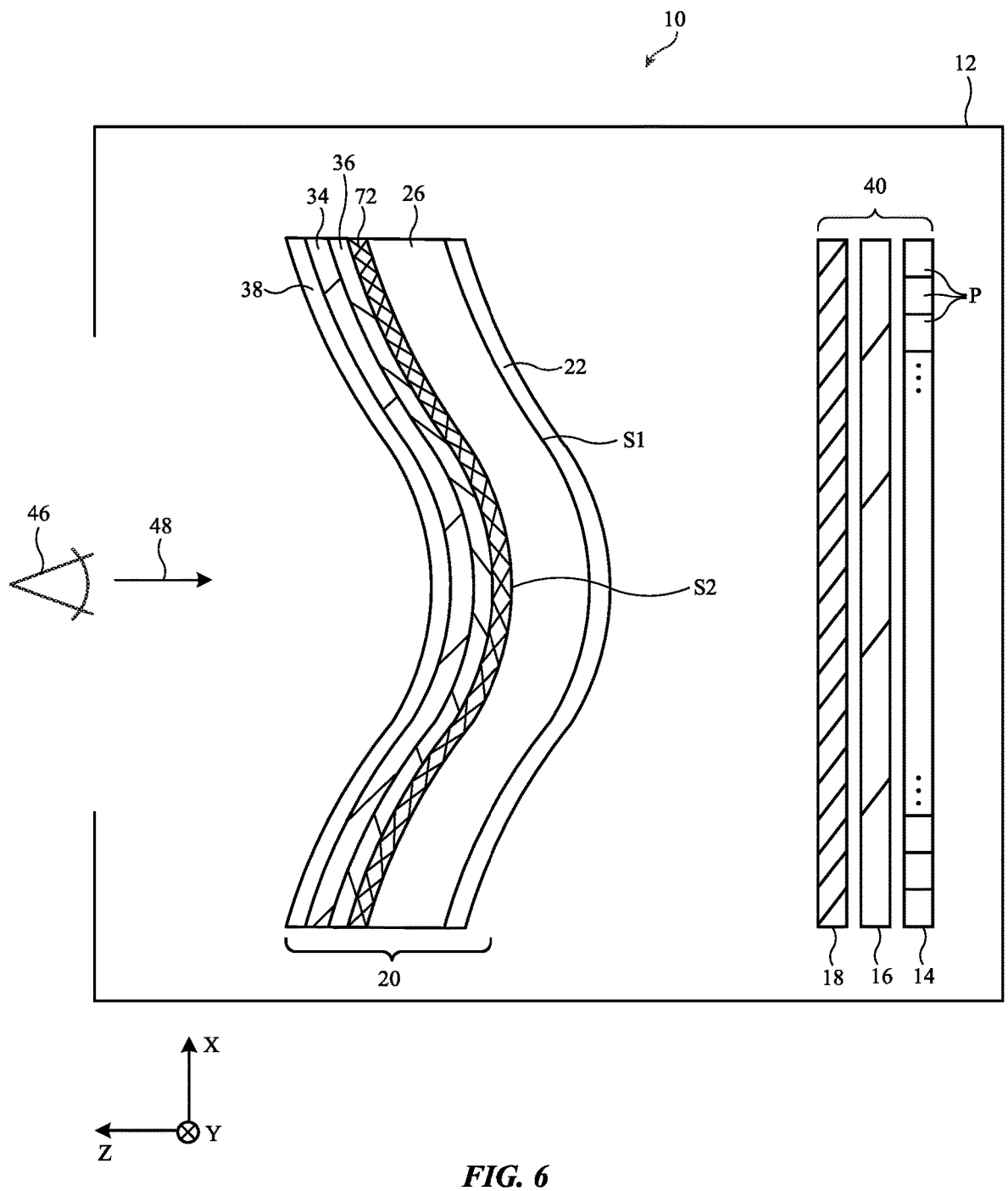
FIG. 6 is a diagram of an illustrative head-mounted display showing components of an illustrative optical system in the head-mounted display with a reflective polarizer and retarder layer in accordance with an embodiment.

FIG. 6 is a cross-sectional side view of an alternate design for optical system 20. Optical system 20 in FIG. 6 is similar to the optical system shown in connection with FIG. 2. Optical system 20 in FIG. 6 includes a lens element 26 having an aspheric convex surface S1 and an aspheric concave surface S2. On the side of lens element 26 facing eye 46, there is an adhesive layer 36, linear polarizer 34, and coatings 38. On the side of lens element 26 facing display 14, there is a partially reflective layer 22. These layers are all in the same relative positions as in FIG. 2.

However, in FIG. 2, there is a retarder 28 on surface S2 of lens element 26 and a separate reflective polarizer 30 that is coupled to retarder 28 using adhesive layer 32. In contrast, in FIG. 6 a single reflective polarizer and retarder layer 72 is used instead of a separately formed reflective polarizer and retarder. As shown in FIG. 6, reflective polarizer and retarder layer 72 (sometimes referred to as circular reflective polarizer 72) is coated directly on surface S2 of lens element 26. Reflective polarizer and retarder layer 72 may reflect light having a first circular polarization type and may transmit light having a second, opposite circular polarization type. The light transmitted through reflective polarizer and retarder layer 72 may be converted from circularly polarized light to linearly polarized light.

Reflective polarizer and retarder layer 72 may be formed from cholesteric liquid crystal or any other desired materials. The retardation provided by reflective polarizer and retarder layer 72 on transmitted light may be uniform across the reflective polarizer and retarder layer 72. As specific examples, the retardation provided by reflective polarizer and retarder layer 72 across the entire reflective polarizer and retarder layer may be uniform within 20%, within 10%, within 5%, within 3%, within 2%, within 1%, etc. Similarly, the thickness of reflective polarizer and retarder layer 72 across the entire reflective polarizer and retarder layer may be uniform within 20%, within 10%, within 5%, within 3%, within 2%, within 1%, etc. In other words, the retardation variation across the reflective polarizer and retarder layer is no more than 20%, no more than 10%, no more than 5%, no more than 3%, no more than 2%, no more than 1%, etc. The thickness variation across the reflective polarizer and retarder layer is no more than 20%, no more than 10%, no more than 5%, no more than 3%, no more than 2%, no more than 1%, etc.

Figure 7:
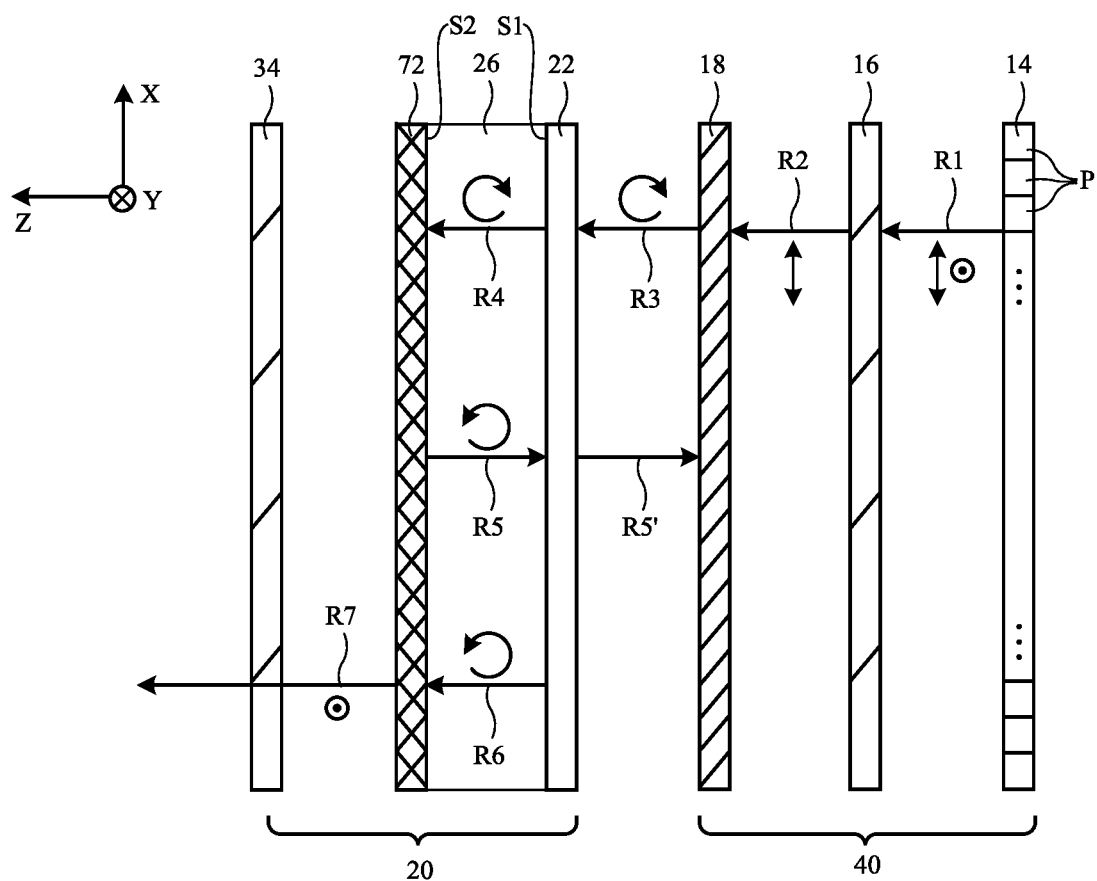
FIG. 7 is a cross-sectional side view of an illustrative head-mounted display showing how the polarization of light changes when passing through the optical system of FIG. 6 in accordance with an embodiment.

FIG. 7 is a cross-sectional side view of an illustrative optical system 20 and display system 40 showing how light from the display passes through the optical system of FIG. 6. Note that the adhesive layer 36 as well as coatings 38 are not shown in FIG. 7 since these layers do not appreciably impact the polarization of light travelling through the system. As shown in FIG. 7, a light ray R1 may be emitted from display 14. Light ray R1 exits display 14 having a mix of polarization states. As image light ray R1 exits display 14 and passes through linear polarizer 16, ray R1 becomes linearly polarized in alignment with the pass axis of linear polarizer 16. The pass axis of linear polarizer 16 may be, for example, aligned with the X-axis of FIG. 7. After passing through polarizer 16, ray R2 passes through wave plate 18, which may be a quarter wave plate. As ray R2 passes through quarter wave plate 18, ray R3 exits the quarter wave plate circularly polarized (e.g., with a clockwise circular polarization).

When circularly polarized ray R3 strikes partially reflective mirror 22, a portion of ray R3 will pass through partially reflective mirror 22 to become reduced-intensity ray R4. Ray R4 will be refracted (partially focused) by the shape of aspheric convex surface S1 of lens element 26. It should be noted that the depiction of surfaces of S1 and S2 as planar in FIG. 7 is merely illustrative. In practice, surfaces S1 and S2 may be curved (e.g., aspheric) as discussed in connection with FIG. 2.

Reflective polarizer and retardation layer 72 may reflect light having clockwise circular polarization (a first circularly polarization) and may transmit light having counter-clockwise circular polarization (a second, opposite circular polarization). Accordingly, R4 is reflected by reflective polarizer and retardation layer 72. Reflected ray R5 passes through lens element 26 and a portion of ray R5 will be reflected in the positive Z direction by the partially reflective mirror 22 on the convex surface S1 of lens element 26 as reflected ray R6. The reflection from the curved shape of surface S1 provides optical system 20 with additional optical power. It should be noted that any portion of ray R5 that is transmitted by the partially reflective layer 22 (e.g., R5' in the negative Z-direction) may be converted to a linear polarization by quarter wave plate 18 and then reaches linear polarizer 16. This linearly polarized light has a polarization aligned with the Y-axis (e.g., orthogonal to the pass axis of linear polarizer 16) so that it is absorbed by linear polarizer 16. As a result, contrast degradation and stray light artifacts from this portion of R5 are prevented in the image viewed by the user.

Ray R6 from partially reflective mirror 22 is converted from circularly polarized light to linearly polarized light ray R7 by reflective polarizer and retardation layer 72. Reflective polarizer and retardation layer 72 transmits counter-clockwise circularly polarized light and converts this light to linearly polarized light. Passing through the curved surface S2 of lens element 26 also provides optical system 20 with additional optical power.

The linear polarization of ray R7 is aligned with the Y-axis, which is parallel to the pass axis of linear polarizer 34. Linear polarizer 34 has a pass axis aligned with the pass axis of reflective polarizer and retardation layer 72 (i.e., parallel to the Y-axis in this example) and will therefore remove any residual non-Y-axis polarization from ray R7 before ray R7 reaches viewers eye 46. Linear polarizer 34 has a pass axis (parallel to the Y-axis) that is orthogonal to the pass axis (parallel to the X-axis) of linear polarizer 16 in the display.

Figure 8:
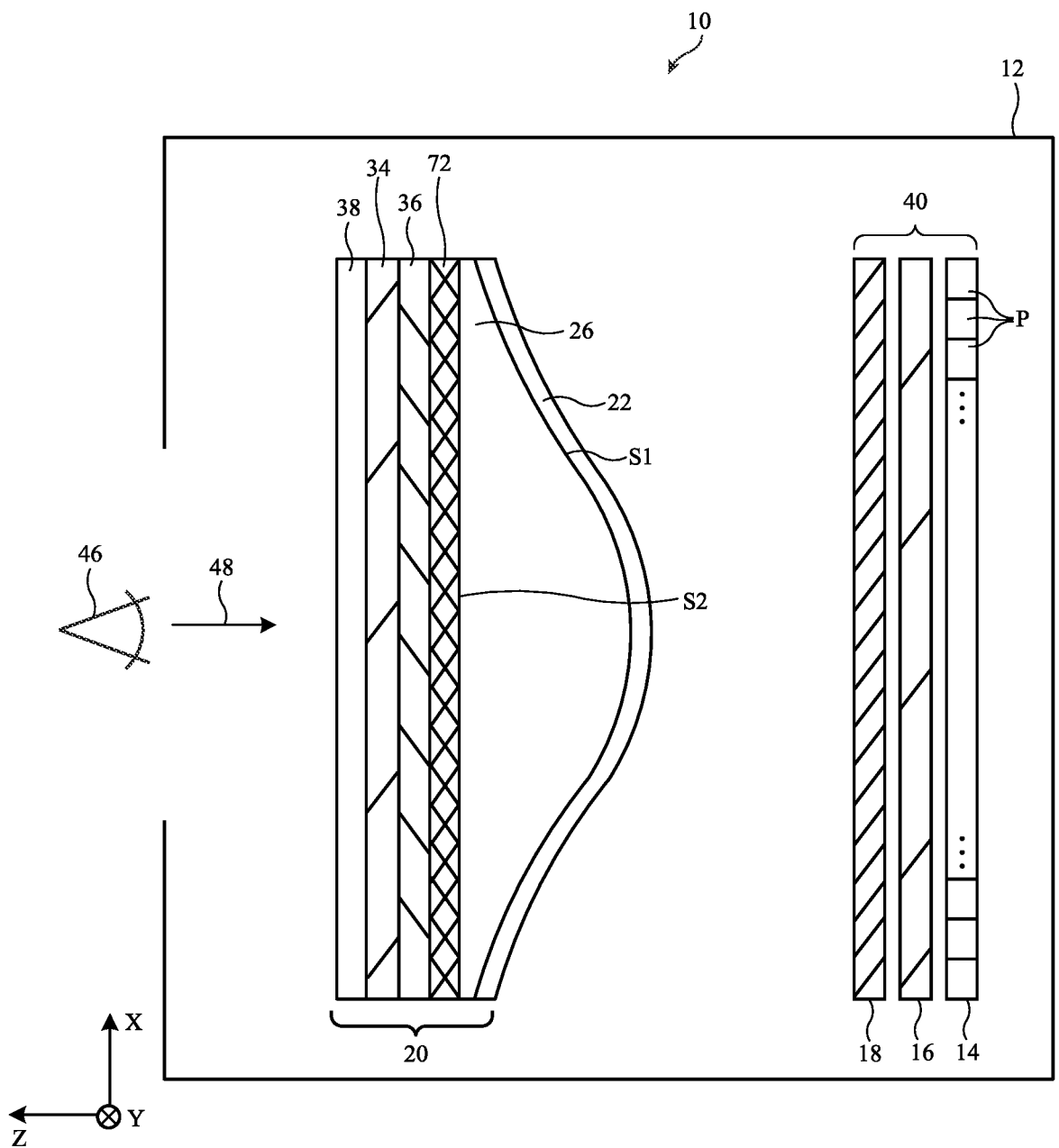
FIG. 8 is a diagram of an illustrative head-mounted display showing components of an illustrative optical system in the head-mounted display with a planar reflective polarizer and retarder layer that provides optical power in accordance with an embodiment.

FIG. 8 is a cross-sectional side view of an alternate design for optical system 20. Optical system 20 in FIG. 8 is similar to the optical system shown in connection with FIG. 6. Optical system 20 in FIG. 8 includes a lens element 26 having an aspheric convex surface S1. On the side of lens element 26 facing eye 46, there is a reflective polarizer and retarder layer 72, adhesive layer 36, linear polarizer 34, coatings 38. On the side of lens element 26 facing display 14, there is a partially reflective layer 22. These layers are all in the same relative positions as in FIG. 6.

However, in FIG. 6, surface S2 of lens element 26 is aspheric concave. In FIG. 8, surface S2 of lens element 26 is planar. Reflective polarizer and retarder layer 72 is also planar but is patterned to provide additional optical power. The function of the layers in the optical system of FIG. 8 is the same as described in connection with FIGS. 6 and 7 (e.g., the polarization of light is manipulated in the same way as in FIGS. 6 and 7). However, reflective polarizer and retarder layer 72 in FIG. 8 is patterned to have optical power.

Reflective polarizer and retarder layer 72 may be formed from a patterned material such as patterned cholesteric liquid crystal. Reflective polarizer and retarder layer 72 may be patterned to form a Fresnel lens, as one example. Having reflective polarizer and retarder layer 72 provide optical power allows for the same optical power to be achieved while having surface S2 be planar, which may improve the ease and cost of manufacturing. The retardation provided by reflective polarizer and retarder layer 72 on transmitted light may be uniform across the reflective polarizer and retarder layer 72. As specific examples, the retardation provided by reflective polarizer and retarder layer 72 across the entire reflective polarizer and retarder layer may be uniform within 20%, within 10%, within 5%, within 3%, within 2%, within 1%, etc. Similarly, the thickness of reflective polarizer and retarder layer 72 across the entire reflective polarizer and retarder layer may be uniform within 20%, within 10%, within 5%, within 3%, within 2%, within 1%, etc. In other words, the retardation variation across the reflective polarizer and retarder layer is no more than 20%, no more than 10%, no more than 5%, no more than 3%, no more than 2%, no more than 1%, etc. The thickness variation across the reflective polarizer and retarder layer is no more than 20%, no more than 10%, no more than 5%, no more than 3%, no more than 2%, no more than 1%, etc.

Any of the retarder layers in the aforementioned embodiments (e.g., retarder 28 in FIGS. 2 and 4, retarders 28-1 and 28-2 in FIG. 5, and reflective polarizer and retarder layer 72 in FIGS. 6 and 8) may be formed using any desired techniques. For example, the retarder layer may be formed as a coating (e.g., a liquid coating) on the lens element (e.g. using spin coating, spray coating, physical vapor deposition, etc.). Alternatively, a film-based retarder layer may be formed on the lens element (e.g., a solid retarder film may be laminated to the lens element). In yet another example, the retarder may include a retarder layer that is coated on a flat carrier (e.g., liquid material for the retarder layer is coated on a solid carrier). The flat carrier and retarder combination is then applied (e.g., laminated) to the curved surface of the lens element. In yet another example, a carrier layer may be used for smoothing of the lens element (e.g., to cover any roughness or imperfections in the lens element). For example, a carrier layer for the retarder may be applied (e.g., coated or laminated) to the lens element and then the retarder layer may be applied (e.g., coated or laminated) to the carrier layer.

Figure 9:
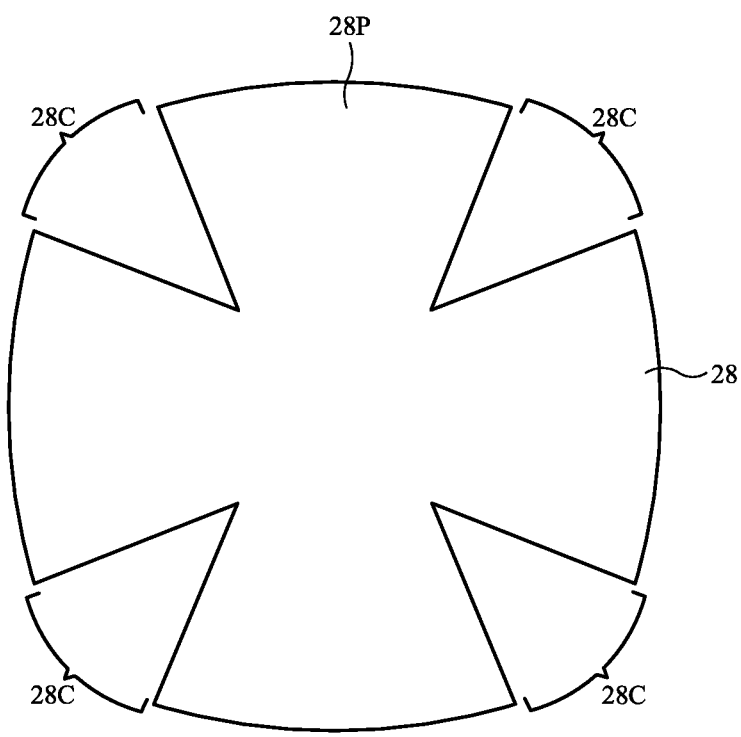
FIG. 9 is a top view of an illustrative retarder layer with cutouts in accordance with an embodiment.

In cases where the retarder layer is formed as a film that is laminated to the surface of lens element 26, the retarder layer may have cutouts to improve the ability of the film to conform to the three-dimensional surface of the lens element. FIG. 9 is a top view of a retarder 28 with cutouts.

As shown in FIG. 9, retarder 28 has a plurality of cutouts 28C. Each cutout may be interposed between respective protruding portions 28P of the retarder. These cutouts allow the retarder to conform to a desired three-dimensional surface (e.g., an aspheric concave surface or aspheric convex surface). The number of cutouts and the shape of the cutouts in FIG. 9 is merely illustrative. In general, any desired number of cutouts of any desired shape may be used. Additionally, an additional gap filling material (e.g., having the same index of refraction as the retarder layer) may optionally be applied in the cutout areas to avoid the cutouts being visible to the viewer.

It should be noted that the use of reference numeral '28' in FIG. 9 is merely illustrative. This technique may be used on any of the aforementioned retarder layers or other films (e.g., retarder 28 in FIGS. 2 and 4, retarders 28-1 and 28-2 in FIG. 5, and reflective polarizer and retarder layer 72 in FIGS. 6 and 8).

Optical system 20 may include only the single lens element 26 (e.g., and no additional lens elements). The optical system may sometimes be referred to as a lens module or a lens stack. The optical system includes a plurality of optical layers coupled together without an air gap. In some cases, one or more additional lens elements (that are optionally) separated from the lens module by air gaps may be included in the head-mounted device for additional manipulation of light within the optical system.

The aforementioned examples of optical system 20 including only a single lens element are merely illustrative. In some cases, the optical system may include more than one lens element (e.g., two lens elements, three lens elements, four elements, more than four elements, etc.).

Figure 10:
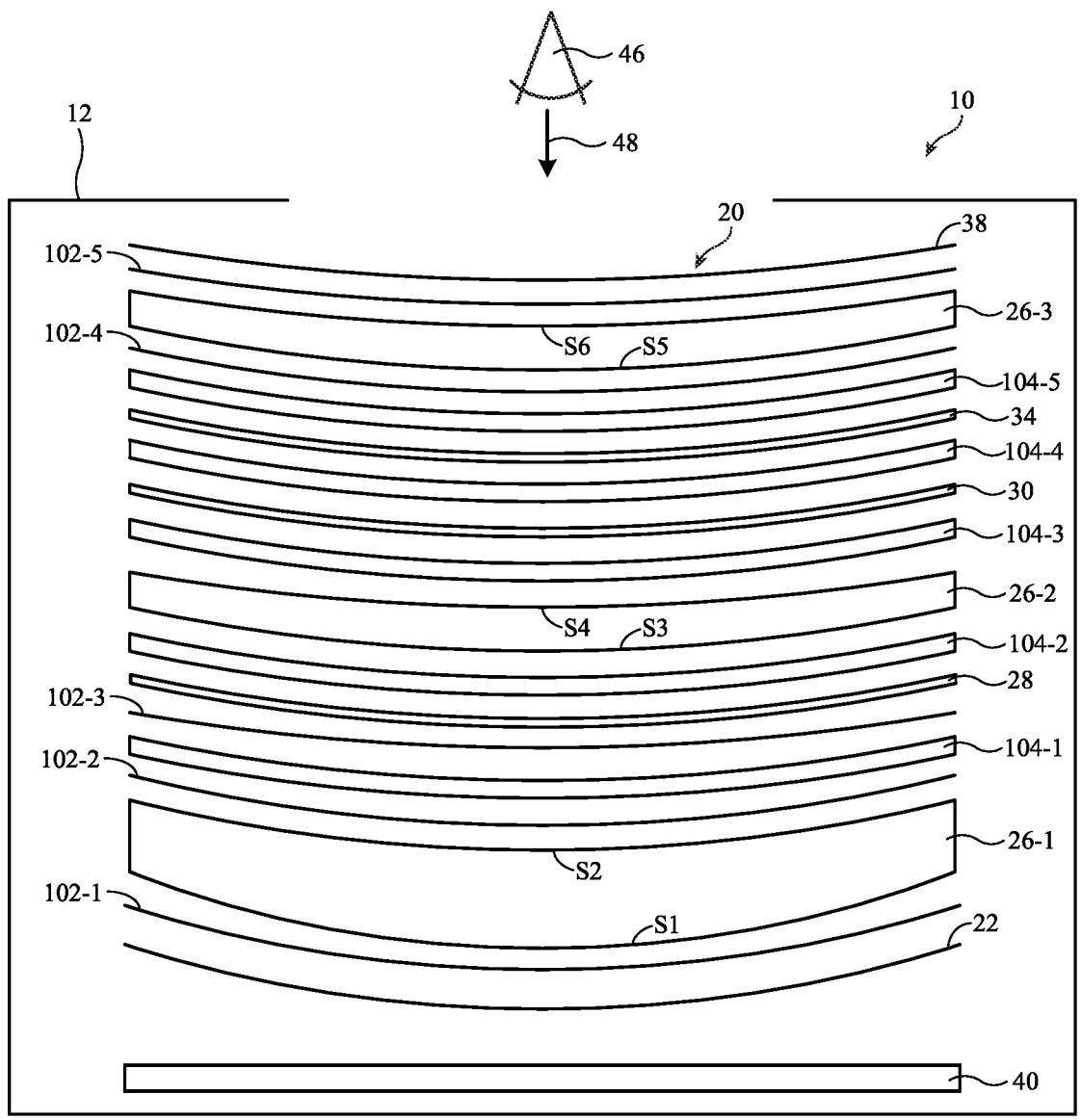
FIG. 10 is a cross-sectional side view of an illustrative head-mounted display showing components of an illustrative optical system with three lens elements, five adhesive layers, and five hard coatings, in accordance with an embodiment.

FIG. 10 is a cross-sectional side view of an optical system 20 that includes three lens elements. As shown, optical system includes lens element 26-1, lens element 26-2, and lens element 26-3. Each one of the lens elements may be formed from a transparent material such as plastic or glass. In the example of FIG. 10, lens element 26-1 has a surface S1 that faces display system 40 and a surface S2 that faces the user (e.g., eye 46). Lens element 26-2 has a surface S3 that faces lens element 26-1 and display system 40 and a surface S4 that faces the user (e.g., eye 46). Lens element 26-5 has a surface S5 that faces lens elements 26-1/26-2 and display system 40 and a surface S6 that faces the user (e.g., eye 46).

As shown in the example of FIG. 10, surfaces S1, S3, and S5 (facing the display system) may be convex surfaces whereas surfaces S2, S4, and S6 (facing the user) may be concave surfaces. Each convex surface in the optical system may be a spherically convex surface, a cylindrically convex surface, an aspherically convex surface, etc. Each concave surface in the optical system may be a spherically concave surface, a cylindrically concave surface, an aspherically concave surface, etc.

Optical structures such as partially reflective coatings, wave plates, reflective polarizers, linear polarizers, antireflection coatings, and/or other optical components may be incorporated into the optical system of FIG. 10. The same functional layers as described in connection with FIG. 2 may be incorporated into the optical system of FIG. 10. Specifically, the optical system in FIG. 10 includes a partially reflective mirror 22, a wave plate 28, a reflective polarizer 30, a linear polarizer 34, and coatings 38. Coatings 38 may include an anti-reflective coating and may sometimes be referred to as anti-reflective coating 38 or anti-reflective layer 38.

The order of the aforementioned functional layers relative to the display system is the same in FIG. 10 as in FIG. 2. In other words, in FIG. 2, the optical system includes half mirror 22, wave plate 28, reflective polarizer 30, linear polarizer 34, and anti-reflective coating 38 in that order (moving from the display towards the viewer). Similarly, in FIG. 10, the optical system includes half mirror 22, wave plate 28, reflective polarizer 30, linear polarizer 34, and anti-reflective coating 38 in that order (moving from the display towards the viewer). Therefore, even though the optical system of FIG. 10 includes additional lens elements, hard coatings, and adhesive layers relative to the optical system of FIG. 2, the polarization state of the light passing through the system will be the same in FIG. 10 as in FIG. 2 (e.g., the light in FIG. 10 will have polarization states manipulated similar to as shown in FIG. 3, with additional refraction from the additional lens elements).

In addition to the lens elements 26-1/26-2/26-3, half mirror 22, wave plate 28, reflective polarizer 30, linear polarizer 34, and anti-reflective coating 38, the optical system may include one or more hard coat layers 102 and one or more adhesive layers 104. The hard coat layers 102 (sometimes referred to as hard coatings 102) may be used to protect the lens elements from damage during assembly and operation of the electronic device. Each individual lens element may be produced separately during manufacturing. The separate lens elements may then be assembled together with adhesive. In this type of manufacturing process, the hard coatings may protect the lens elements from damage during the assembly process. The adhesive layers 104 used to adhere the discrete lens elements together may be optically clear adhesive (OCA) layers such as liquid optically clear adhesive (LOCA) layers. The hard coatings 102 and optically clear adhesive layers 104 may have a high transparency (greater than 80%, greater than 90%, greater than 95%, greater than 99%, greater than 99.9%, etc.) to avoid reducing the efficiency of the system.

In FIG. 10, there are five hard coatings 102-1, 102-2, 102-3, 102-4, and 102-5. Hard coating 102-1 is adjacent to surface S1 of lens element 26-1 (between lens element 26-1 and half mirror 22). Hard coating 102-2 is adjacent to surface S2 of lens element 26-1 (between lens element 26-1 and quarter wave plate 28). Hard coating 102-3 is adjacent to quarter wave plate 28 (also between quarter wave plate 28 and lens element 26-1). Hard coating 102-4 is adjacent to surface S5 of lens element 26-3 (between lens element 26-3 and linear polarizer 34). Hard coating 102-5 is positioned adjacent to surface S6 of lens element 26-3 (between lens element 26-3 and anti-reflective coating 38).

In FIG. 10, there are five adhesive layers. Adhesive layer 104-1 is positioned between hard coatings 102-2 and 102-3. Adhesive layer 104-2 is positioned adjacent to surface S3 of lens element 26-2 (between quarter wave plate 28 and lens element 26-2). Adhesive layer 104-3 is positioned adjacent to surface S4 of lens element 26-2 (between lens element 26-2 and reflective polarizer 30). Adhesive layer 104-4 is positioned between reflective polarizer 30 and linear polarizer 34. Adhesive layer 104-5 is positioned between linear polarizer 34 and hard coating 102-4.

The example of an optical system shown in FIG. 10 is merely illustrative. In some cases, the optical system may be manufactured using one or more direct 3D printing or 3D forming steps. In the 3D printing process, material for a component in the optical system (e.g., material for a lens element) may be printed directly on the underlying layers in the stack. This type of direct printing process may be used for one or more components in the optical system.

There are many benefits to using direct 3D printing during manufacturing of the optical system. One or more adhesive layers may be omitted from the optical system (since the layers are formed together directly and do not need to be attached with a separate adhesive). Omitting adhesive layers in the optical system reduces the material cost of the optical system. Additionally, achieving bubble-free adhesive layers in the optical system may be challenging. Therefore, omitting adhesive layers also simplifies the manufacturing cost and complexity of the optical system.

Using direct 3D printing during manufacturing of the optical system reduces the amount of handling of individual lens elements. This allows for one or more hard coatings in the stack to be omitted. Omitting hard coatings in the optical system reduces the cost and manufacturing complexity of the optical system.

Omitting adhesive layers and/or hard coatings reduces the weight and thickness of the optical system. Weight is an important performance metric for head-mounted devices to ensure comfortable operation by a user. Space in a head-mounted device may also be at a premium, so reducing the thickness of the optical system is helpful.

Using direct printing of one or more components in the optical system also improves the lens assembly and alignment process for the optical system. A single lens assembly station may be used with each component formed on the underlying component in a bottom-up manner. This type of technique allows each component in the optical system to be more easily aligned with its adjacent components.

FIGS. 11-17 are cross-sectional side views of illustrative optical systems that are formed using one or more direct printing steps, allowing for one or more adhesive layers or hard coatings to be omitted relative to the example of FIG. 10.

Figure 11:
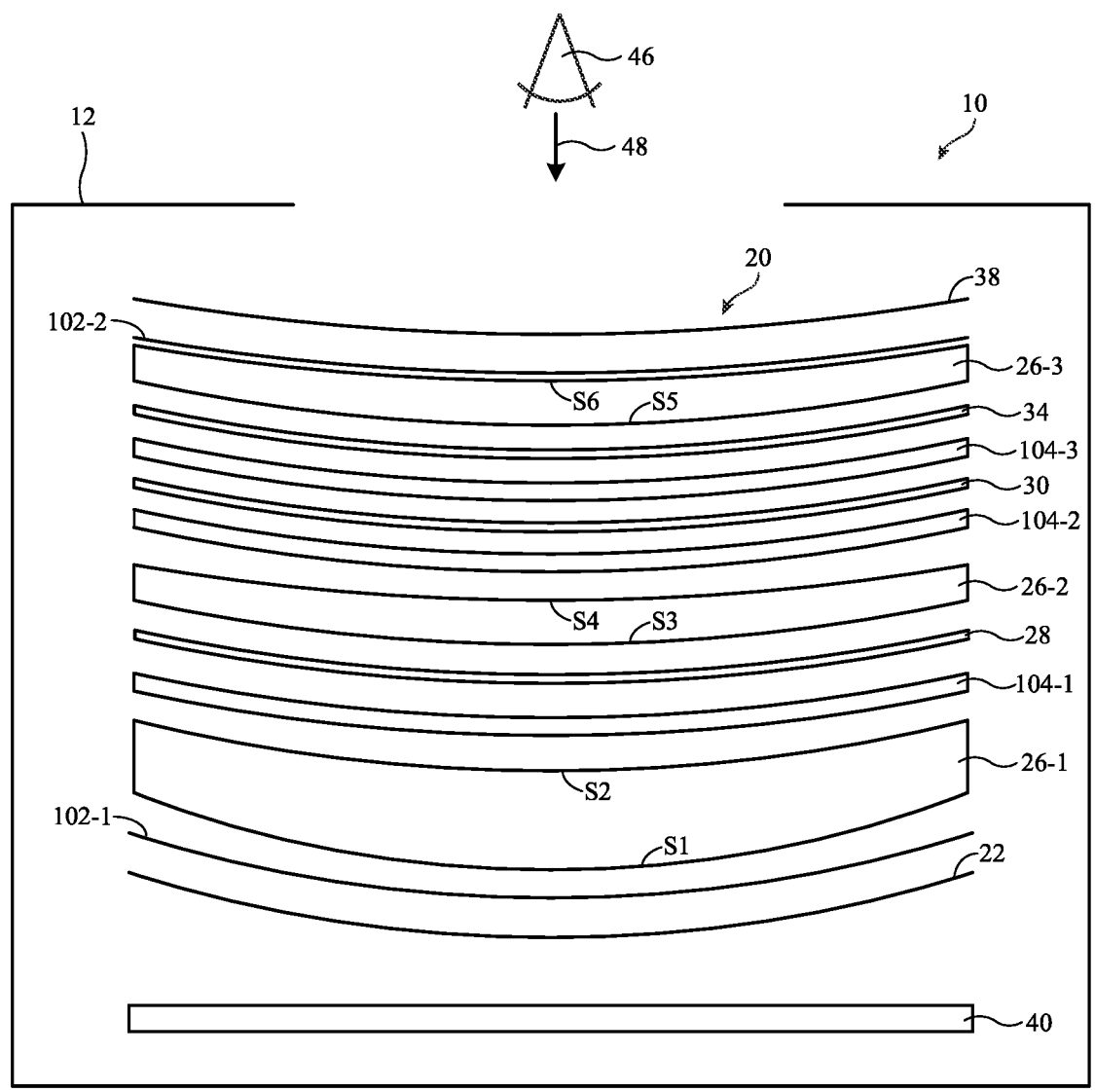
FIG. 11 is a cross-sectional side view of an illustrative head-mounted display showing components of an illustrative optical system with three lens elements, three adhesive layers, and two hard coatings, in accordance with an embodiment.

In the example of FIG. 11, two of the adhesive layers and three of the hard coatings are omitted relative to FIG. 10 (e.g., the optical system in FIG. 11 includes 3 adhesive layers and 2 hard coatings). Because the components are assembled in a bottom-up fashion in FIG. 11, only two hard coatings are used (e.g., hard coating 102-1 adjacent to surface S1 of lens element 26-1 and hard coating 102-2 adjacent to surface S6 of lens element 26-3). In the example of FIG. 11, adhesive layer 104-1 may be formed directly on surface S2 of lens element 26-1 (e.g., in direct contact without an air gap) and quarter wave plate 28 may be formed directly on the adhesive layer 104-1. In other words, hard coatings 102-2 and 102-3 from FIG. 10 may be omitted in FIG. 11, with no hard coatings between lens elements 26-1 and 26-2 in FIG. 11. Additionally, hard coating 102-4 from FIG. 10 may be omitted in FIG. 11. Three total hard coatings are therefore omitted in FIG. 11 relative to FIG. 10.

Lens element 26-2 may be directly printed on quarter wave plate 28 (e.g., using a 3D printing or 3D forming process). Thus, in the final stack, there is no adhesive layer between lens element 26-2 and quarter wave plate 28. Lens element 26-2 (e.g., surface S3) and quarter wave plate 28 may be in direct contact without an intervening air gap.

Lens element 26-3 may be directly printed on linear polarizer 34 (e.g., using a 3D printing or 3D forming process). Thus, in the final stack, there is no adhesive layer between lens element 26-3 and linear polarizer 34. Lens element 26-3 (e.g., surface S5) and linear polarizer 34 may be in direct contact without an intervening air gap. Two total adhesive layers are therefore omitted in FIG. 11 relative to FIG. 10.

Figure 12:
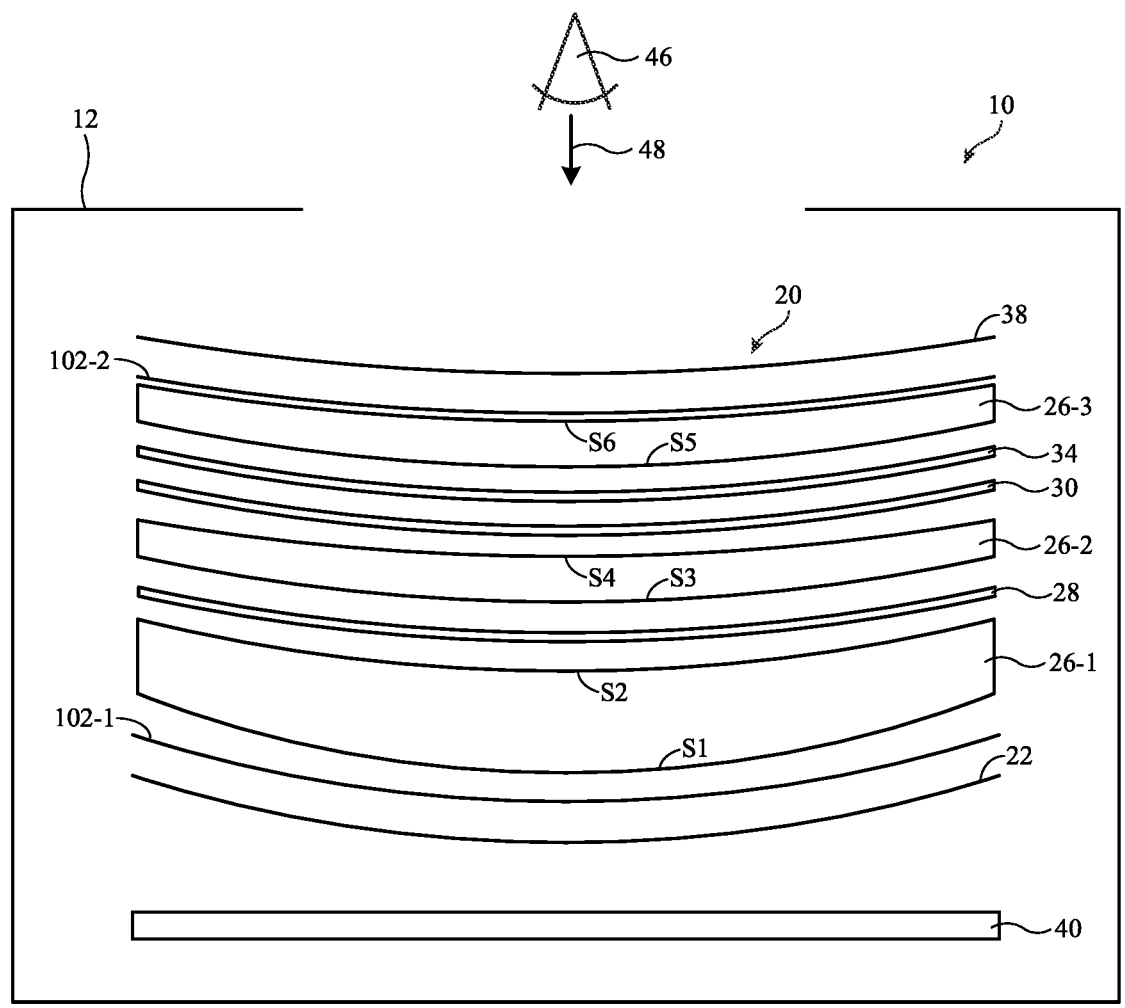
FIG. 12 is a cross-sectional side view of an illustrative head-mounted display showing components of an illustrative optical system with three lens elements, no adhesive layers, and two hard coatings, in accordance with an embodiment.

In the example of FIG. 12, all five of the adhesive layers and three of the hard coatings are omitted relative to FIG. 10 (e.g., the optical system in FIG. 12 includes 0 adhesive layers and 2 hard coatings). Because the components are assembled in a bottom-up fashion in FIG. 12, only two hard coatings are used (e.g., hard coating 102-1 adjacent to surface S1 of lens element 26-1 and hard coating 102-2 adjacent to surface S6 of lens element 26-3).

In FIG. 11, three adhesive layers are included in the optical system. Adhesive layer 104-1 attaches lens element 26-1 to quarter wave plate 28. Adhesive layer 104-2 attaches reflective polarizer 30 to lens element 26-2. Adhesive layer 104-3 attaches linear polarizer 34 to reflective polarizer 30.

In FIG. 12, quarter wave plate 28, reflective polarizer 30, and linear polarizer 34 are formed using a direct 3D printing process, obviating the need for adhesive layers. As shown in FIG. 12, quarter wave plate 28 is formed directly on surface S2 of lens element 26-1 without an intervening adhesive layer. Reflective polarizer 30 is formed directly on surface S4 of lens element 26-2 without an intervening adhesive layer. Linear polarizer 34 is formed directly on reflective polarizer 30 without an intervening adhesive layer. There are therefore no adhesive layers included in the optical system.

The example in FIGS. 11 and 12 of the optical system having three lens elements is merely illustrative. In another example, shown in FIG. 13, the first and second lens elements of FIG. 12 may be merged into a single integrated lens element 26-1. A second lens element 26-2 is also included.

Quarter wave plate 28 may be formed as a coating on surface S2 of lens element 26-1. The quarter wave plate 28 may be formed using a direct 3D printing or coating technique, obviating the need for adhesive between the lens element and the quarter wave plate. The rest of the optical system in FIG. 13 has a similar arrangement as in FIG. 12, with reflective polarizer 30 and linear polarizer formed between quarter wave plate 28 and lens element 26-2 without any intervening adhesive layers. The quarter wave plate 28 may be a coating that is applied directly on the curved surface S2 of lens element 26-1 to provide uniform retardation across the lens element (e.g., using the quarter wave plate coating techniques previously discussed). Quarter wave plate 28 may have a relatively uniform thickness across the surface S2.

As specific examples, the retardation provided by retarder 28 across the entire retarder may be uniform within 20%, within 10%, within 5%, within 3%, within 2%, within 1%, etc. Similarly, the thickness of retarder 28 across the entire retarder may be uniform within 20%, within 10%, within 5%, within 3%, within 2%, within 1%, etc. In other words, the retardation variation across the retarder is no more than 20%, no more than 10%, no more than 5%, no more than 3%, no more than 2%, no more than 1%, etc. The thickness variation across the retarder is no more than 20%, no more than 10%, no more than 5%, no more than 3%, no more than 2%, no more than 1%, etc.

Figure 14:
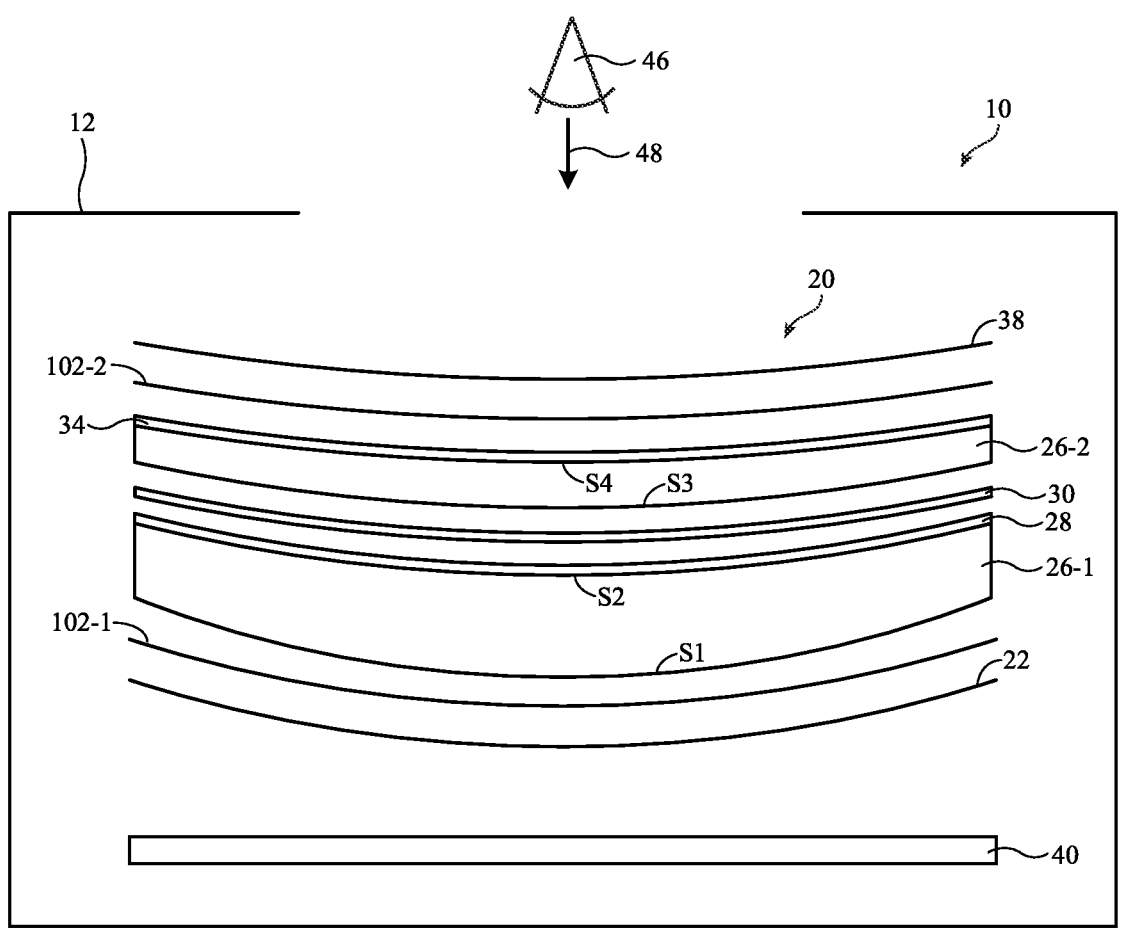
FIG. 14 is a cross-sectional side view of an illustrative head-mounted display showing components of an illustrative optical system with two lens elements, no adhesive layers, two hard coatings, and a linear polarizer coated on one of the lens elements in accordance with an embodiment.

In another example, shown in FIG. 14, the linear polarizer 34 may be integrated with lens element 26-2. The linear polarizer may be directly printed on or integrated into lens 26-2 (e.g., using a direct 3D printing technique). In FIG. 14, linear polarizer 34 is depicted as being printed on surface S4 of lens element 26-2. This example is merely illustrative. Linear polarizer 34 may alternatively be printed on surface S3 of lens element 26-2.

Figure 13:
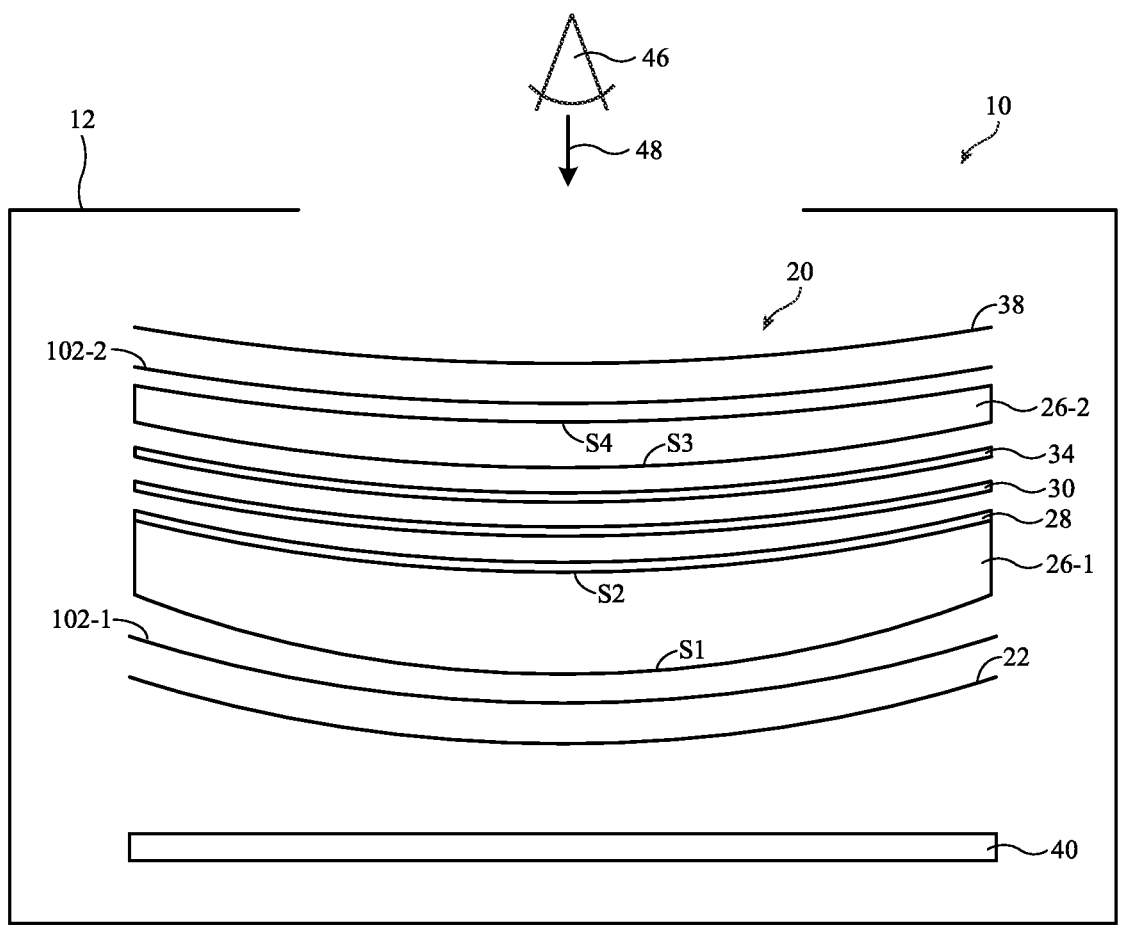
FIG. 13 is a cross-sectional side view of an illustrative head-mounted display showing components of an illustrative optical system with two lens elements, no adhesive layers, and two hard coatings, in accordance with an embodiment.
Figure 15:
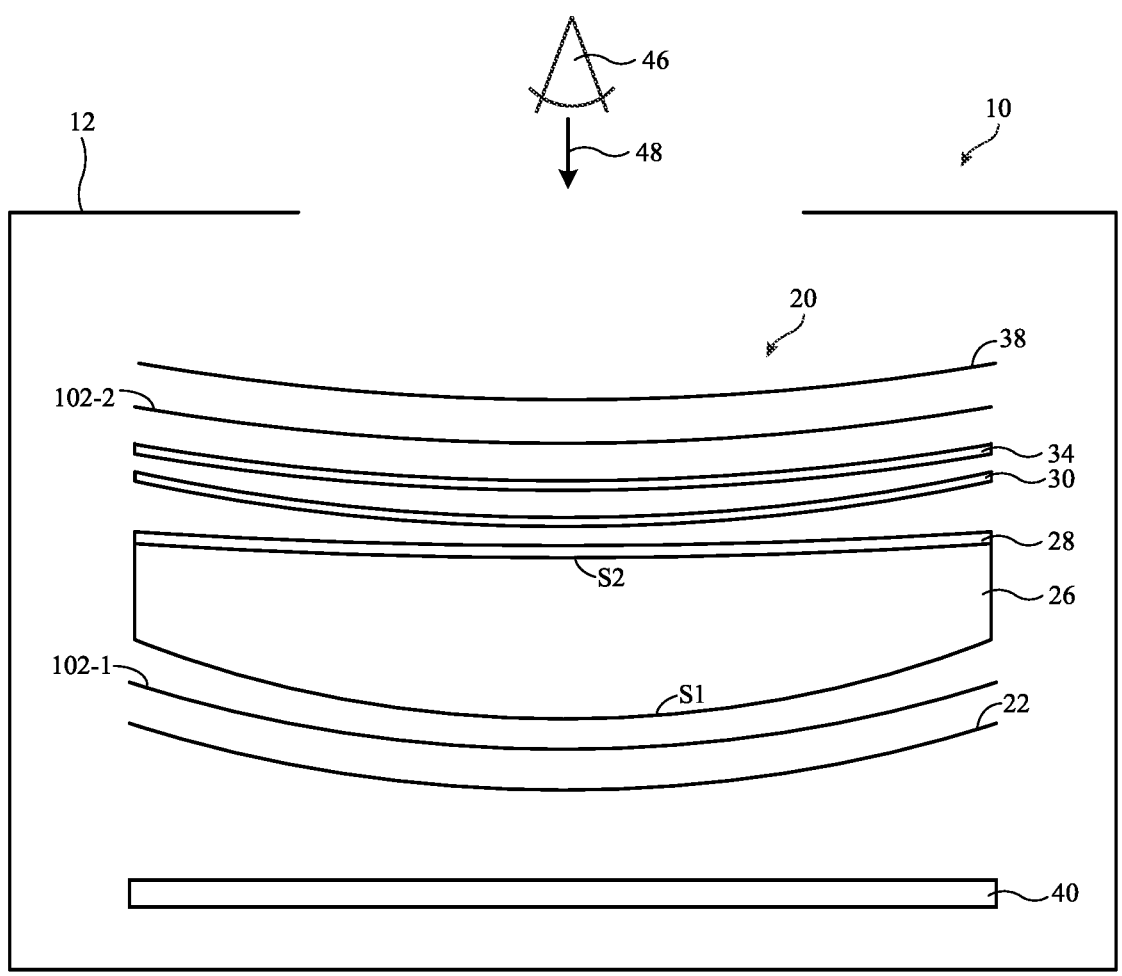
FIG. 15 is a cross-sectional side view of an illustrative head-mounted display showing components of an illustrative optical system with one lens elements, no adhesive layers, and two hard coatings, in accordance with an embodiment.

In another example, shown in FIG. 15, the first and second lens elements of FIGS. 13 and 14 may be merged into a single integrated lens element 26. As shown, quarter wave plate 28 may be formed as a coating on surface S2 of lens element 26. The quarter wave plate 28 may be formed using a direct 3D printing technique, obviating the need for adhesive between the lens element and the quarter wave plate. Reflective polarizer 30 and linear polarizer 34 are formed between quarter wave plate 28 and hard coating 102-2 without any intervening adhesive layers. The quarter wave plate 28 may be a coating that is applied directly on the curved surface of lens element 26 to provide uniform retardation across the lens element (as previously discussed).

The optical systems of FIGS. 11-15 therefore all have a reduced number of components relative to the optical system of FIG. 10. This results in reduced manufacturing cost and complexity for the optical system.

Figure 16:
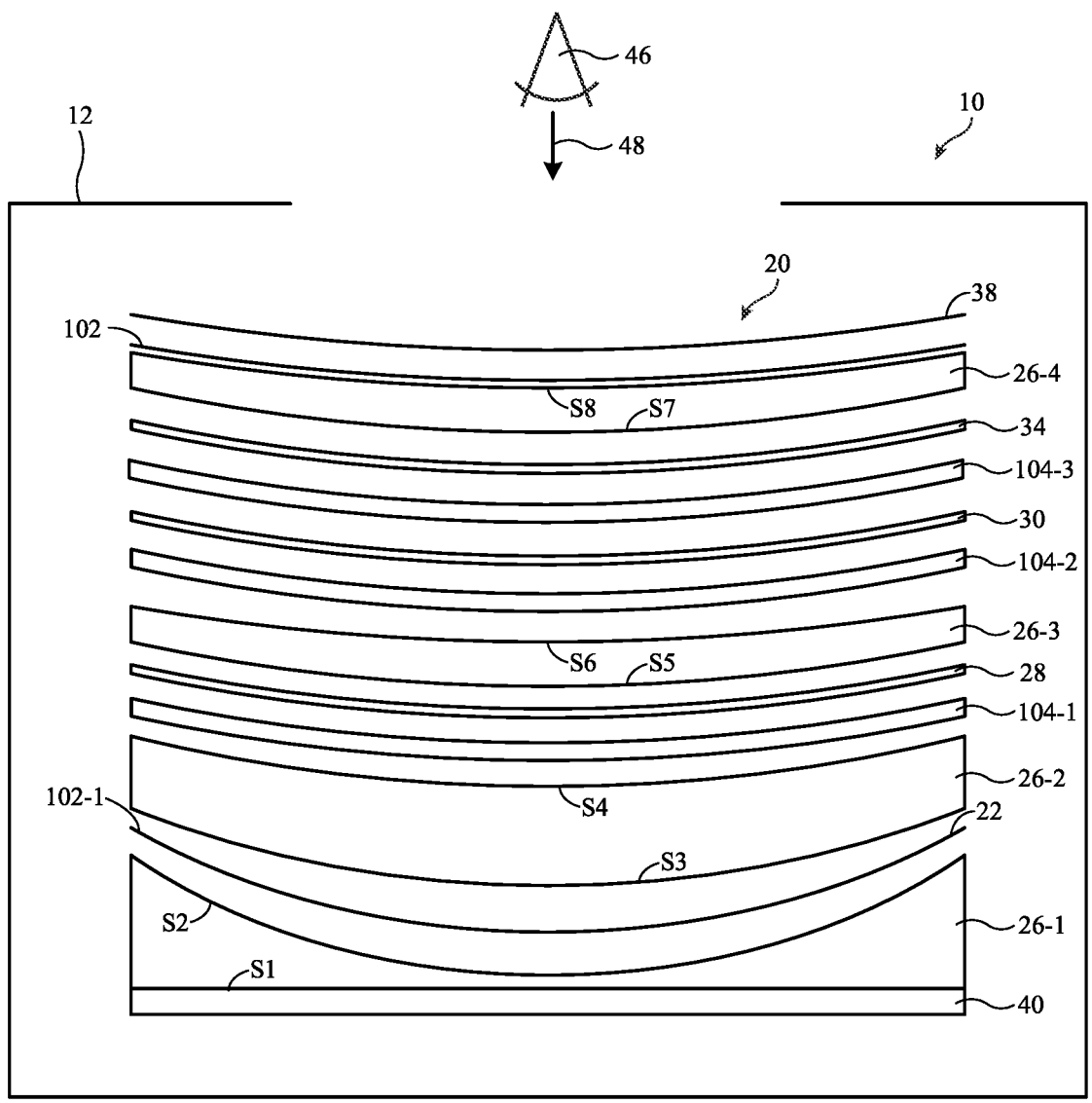
FIG. 16 is a cross-sectional side view of an illustrative head-mounted display showing components of an illustrative optical system with a lens element printed directly on the display panel in accordance with an embodiment.

In another possible embodiment for optical system 20, shown in FIG. 16, a lens element 26-1 may be printed directly on the display panel. Subsequent components may be attached to the lens element in a bottom-up manner, similar to as discussed in connection with FIGS. 11-15. Having a lens element printed directly on the display panel as in FIG. 16 may improve alignment between the optical system 20 and the display panel 40. Without the lens element 26-1 printed directly on display panel 40, the optical system 20 has to be aligned with display panel 40 after the optical system is assembled. By forming the optical system directly on panel 40 during manufacturing, the alignment between the optical system and display panel 40 is greatly simplified.

As shown in FIG. 16, lens element 26-1 may be applied to directly to display panel 40 (e.g., using a direct 3D printing technique). In other words, surface S1 of lens element 26-1 may be in direct contact with display panel 40 without an intervening air gap.

The rest of the optical system has a similar arrangement as shown in FIG. 11, with lens element 26-2 in FIG. 16 having the same properties as lens element 26-1 in FIG. 11, lens element 26-3 in FIG. 16 having the same properties as lens element 26-2 in FIG. 11, and lens element 26-4 in FIG. 16 having the same properties as lens element 26-3 in FIG. 11. Using the lens element 26-1 printed on the display (as in FIG. 16) allows for hard coating 102-1 in FIG. 11 to be omitted from the optical system of FIG. 16. In other words, there is no hard coating between lens element 26-2 and display system 40 in the optical system of FIG. 16. In the optical system of FIG. 16, only one hard coating 102 is included (adjacent to surface S8 of lens element 26-4).

Lens element 26-1 may have a concave surface S2 that conforms to the convex surface of lens element 26-2 and a surface S1 (e.g., a planar surface) that conforms to the upper surface of display panel 40. Surface S1 may have curvature (e.g., concave or convex curvature) in the event that display panel 40 is curved.

To summarize, including an additional lens element directly adjacent to the display panel 40 improves the alignment of the optical system and the display system. Additionally, the additional lens element directly adjacent to the display allows for a hard coating within the optical system to be omitted.

Lens elements 26-1 and 26-2 may be formed from the same material and may have the same index of refraction. In this case, the light from display panel 40 will not be refracted at the interface between lens elements 26-1 and 26-2. Alternatively, lens elements 26-1 and 26-2 may be formed from different materials having different indices of refraction. In this type of arrangement, light from the display panel 40 will be refracted at the interface between lens elements 26-1 and 26-2. In other words, the lens element 26-1 will provide additional lens power at the interface between lens elements 26-1 and 26-2.

Figure 17:
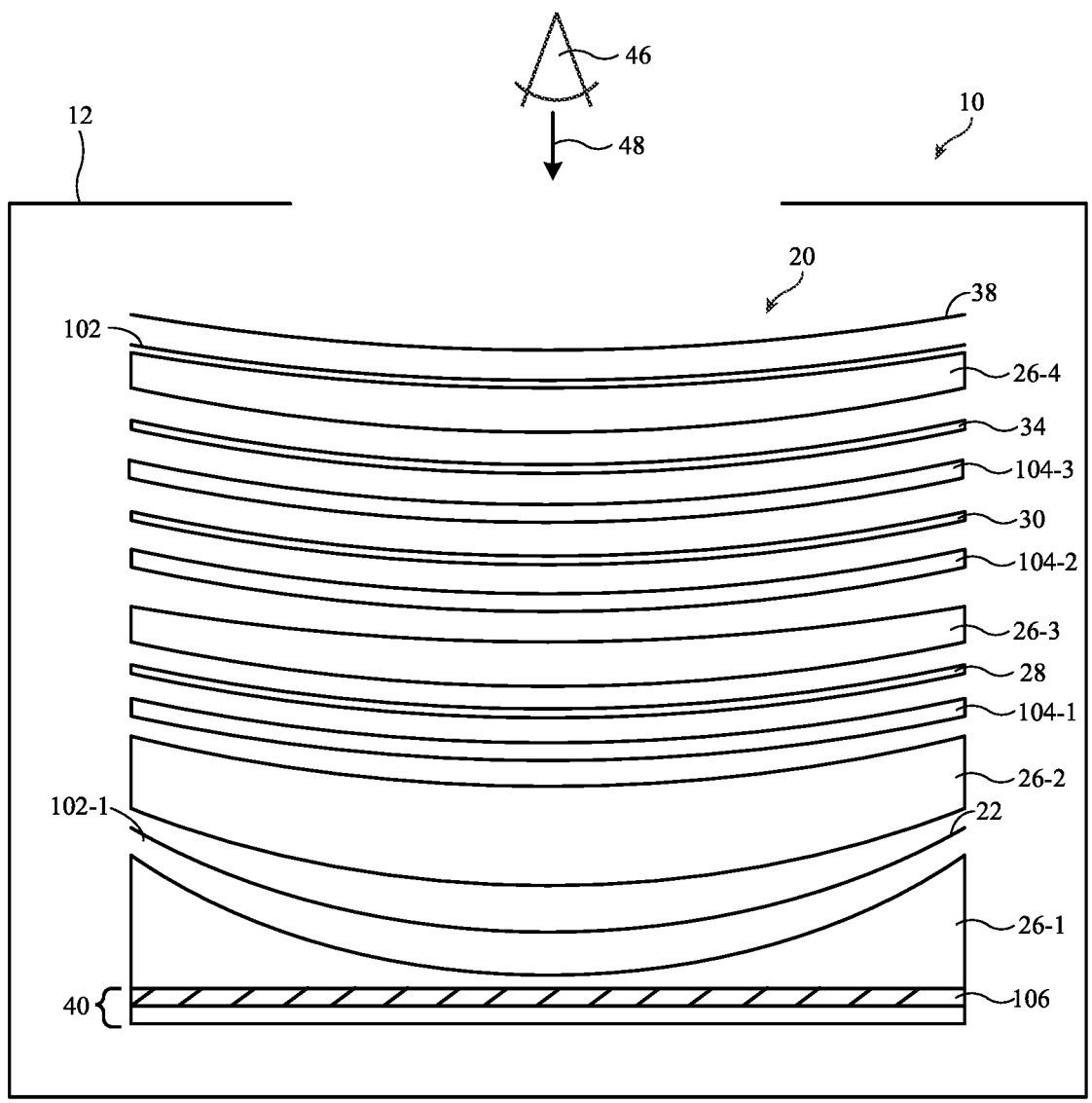
FIG. 17 is a cross-sectional side view of an illustrative head-mounted display showing components of an illustrative optical system with a microlens array printed directly on the display panel and a lens element printed directly on the microlens array in accordance with an embodiment.

In another embodiment, shown in FIG. 17, it may be desirable to include a microlens array 106 over display panel 40. The microlens array may include a plurality of microlenses, with each microlens having a curved upper surface and configured to focus light from the display. Including microlens array 106 in the display system may increase the efficiency of the display system. Microlens array 106 may be referred to as being part of display panel 40. Alternatively, microlens array 106 may be referred to as being formed over display panel 40. It should be understood that display panel 40 in FIGS. 10-17 may include a pixel array 14, linear polarizer 16, and wave plate 18 (e.g., as shown in FIG. 2). The microlens array 106 may, as an example, be formed over the quarter wave plate 18 (e.g., between quarter wave plate 18 and lens element 26-1).

During manufacturing, microlens array 106 may formed on the display system 40 using a 3D printing process. Subsequently, lens element 26-1 may be formed over the microlens array, also using a 3D printing process. This example is merely illustrative. In another possible example, the display system 40 may be separately formed to include microlens array 106. In this case, the lens element 26-1 deposition may be the first 3D printing step of the bottom-up optical system manufacturing.

FIGS. 16 and 17 show examples of having a lens element of optical system 20 printed directly on the display system 40. The rest of optical system 20 in FIGS. 16 and 17 is the same as the optical system in FIG. 11. It should be noted that this example is merely illustrative. In general, the panel printing technique (where a lens element is printed on the display panel for improved alignment) of FIGS. 16 and 17 may be used with an optical system that has the arrangement of FIG. 11, FIG. 12, FIG. 13, FIG. 14, FIG. 15, or any other desired optical system arrangement. In each of FIGS. 11-15, an additional lens element (and optionally a microlens array) may be printed on the display panel between the display panel and lens element 26-1 to implement the panel printing technique of FIG. 16 or 17.

Figure 18:
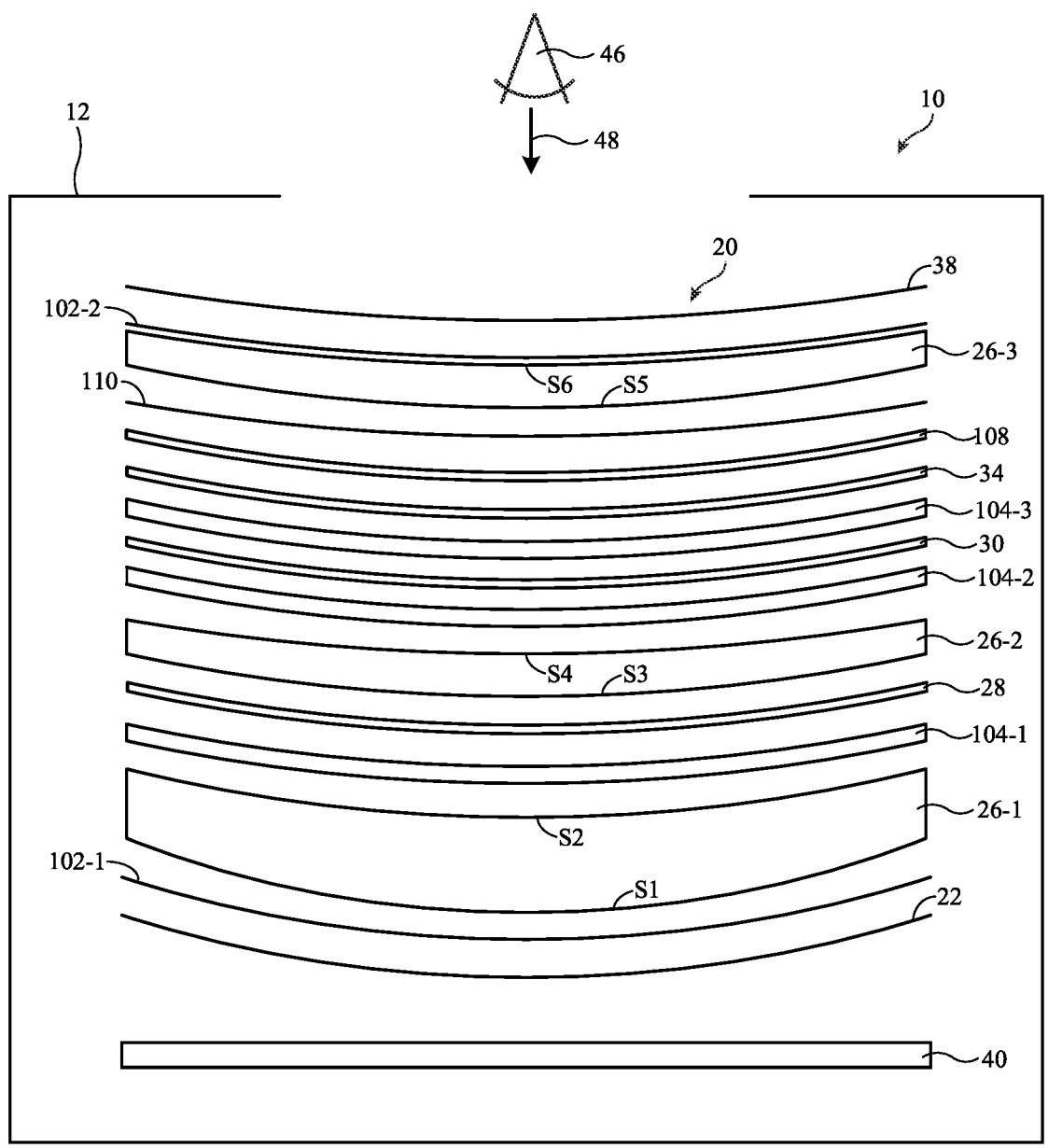
FIG. 18 is a cross-sectional side view of an illustrative head-mounted display showing components of an illustrative optical system with three lens elements, three adhesive layers, two hard coatings, and two quarter wave plates in accordance with an embodiment.

An additional quarter wave plate may optionally be included in the optical system. FIG. 18 is a cross-sectional side view of an illustrative optical system having two quarter wave plates. The optical system of FIG. 18 has the same arrangement as the optical system in FIG. 11, plus two additional layers. In addition to first quarter wave plate 28 (formed between lens elements 26-2 and lens elements 26-1), a second quarter wave plate 108 is formed between linear polarizer 34 and lens element 26-3. An additional anti-reflective coating may also be included in the optical system. Anti-reflective coating 110 may be formed on surface S5 of lens element 26-3 when quarter wave plate 108 is present. Lens element 26-3 is therefore interposed between anti-reflective coatings 110 and 38.

Quarter wave plate 108 may mitigate reflections from interfaces above S5 of lens element 26-3 (e.g., from S6 of lens element 26-3, the user's eyes, etc.). Mitigating reflections in this way beneficially increases the contrast ratio in the system.

Quarter wave plate 108 may be a QWP film that is 3D formed between linear polarizer 34 and lens element 26-3. Alternatively, quarter wave plate 108 may be formed from a liquid material that is coated on the interface between linear polarizer 34 and lens element 26-3. As another option, quarter wave plate 108 may be formed from a liquid material that is 3D printed on the interface between linear polarizer and lens element 26-3. In general, quarter wave plate 108 may be formed from any desired material and may be applied using any desired techniques.

FIG. 18 shows the additional quarter wave plate being applied to the system of FIG. 11. However, it should be understood that the additional quarter wave plate (interposed between the user and linear polarizer 34) and optional additional anti-reflective coating (interposed between the additional quarter wave plate and a lens element) may be applied to any system (e.g., any of the systems shown in FIGS. 10-17).

In FIGS. 10-18, spaces are shown between some of the adjacent layers in optical system 20. It should be understood that this is merely for illustration purposes. In practice, each layer in optical system 20 may be in direct contact with its adjacent layers such that no air gaps are present in the optical system and the optical system 20 is formed as a single, solid lens assembly. One or more air gaps may optionally be formed between layers in the optical system if desired.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system (e.g., an electronic system including the display systems described herein). In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground. Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The display systems described herein may be used for these types of systems and for any other desired display arrangements.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:
1. An electronic device, comprising:
 an array of pixels configured to produce light; and
 a lens module that receives the light from the array of pixels, wherein the lens module comprises:
  a lens element having first and second opposing sides;

a partially reflective mirror on the first side of the lens element; and a cholesteric liquid crystal layer on the second side of the lens element, wherein the cholesteric liquid crystal layer is formed on a surface of the lens element.

2. The electronic device defined in claim 1, wherein the cholesteric liquid crystal layer has a thickness that varies by less than 10% across the cholesteric liquid crystal layer.

3. The electronic device defined in claim 1, wherein the surface is on the second side of the lens element, wherein the lens element has an additional surface on the first side, and wherein the partially reflective mirror is formed on the additional surface.

4. The electronic device defined in claim 3, wherein the additional surface is an aspheric convex surface and wherein the surface is an aspheric concave surface.

5. The electronic device defined in claim 3, wherein the additional surface is a convex surface and wherein the surface is a concave surface.

6. The electronic device defined in claim 1, wherein the partially reflective mirror is interposed between the lens element and the array of pixels.

7. The electronic device defined in claim 1, wherein the partially reflective mirror transmits 50% and reflects 50% of incident light.

8. The electronic device defined in claim 1, wherein the lens module further comprises:
a linear polarizer, wherein the cholesteric liquid crystal layer is interposed between the lens element and the linear polarizer.

9. The electronic device defined in claim 1, wherein the cholesteric liquid crystal layer has a different curvature than the partially reflective mirror.

10. An electronic device, comprising:
an array of pixels configured to produce light; and
a lens module that receives the light from the array of pixels, wherein the lens module comprises:
a lens element having first and second opposing surfaces;
a half mirror on the first surface; and
a cholesteric liquid crystal layer on the second surface, wherein the cholesteric liquid crystal layer reflects incident light having a first circular polarization type and transmits incident light having a second circular polarization type that is opposite the first circular polarization type.

11. The electronic device defined in claim 10, wherein the cholesteric liquid crystal layer has a thickness that varies by less than 10% across the cholesteric liquid crystal layer.

12. The electronic device defined in claim 10, wherein the first surface is an aspheric convex surface and wherein the second surface is an aspheric concave surface.

13. The electronic device defined in claim 10, wherein the first surface is a convex surface and wherein the second surface is a concave surface.

14. The electronic device defined in claim 10, wherein the half mirror is interposed between the lens element and the array of pixels.

15. The electronic device defined in claim 10, wherein the half mirror transmits 50% and reflects 50% of incident light.

16. The electronic device defined in claim 10, wherein the lens module further comprises:
a linear polarizer, wherein the cholesteric liquid crystal layer is interposed between the lens element and the linear polarizer.

17. The electronic device defined in claim 10, wherein the cholesteric liquid crystal layer has a different curvature than the half mirror.

18. An electronic device, comprising:
an array of pixels configured to produce light; and
a lens module that receives the light from the array of pixels, wherein the lens module comprises:
a lens element having first and second opposing sides;
a partially reflective mirror on the first side of the lens element; and
a cholesteric liquid crystal layer on the second side of the lens element, wherein the cholesteric liquid crystal layer has a thickness that varies by less than 10% across the cholesteric liquid crystal layer.

19. The electronic device defined in claim 18, wherein the lens module further comprises:
a linear polarizer, wherein the cholesteric liquid crystal layer is interposed between the lens element and the linear polarizer.

20. An electronic device, comprising:
an array of pixels configured to produce light; and
a lens module that receives the light from the array of pixels, wherein the lens module comprises:
a lens element having first and second opposing sides;
a partially reflective mirror on the first side of the lens element; and
a cholesteric liquid crystal layer on the second side of the lens element, wherein the cholesteric liquid crystal layer has a different curvature than the partially reflective mirror.

* * * * *